United States Patent
Awamura et al.

(10) Patent No.: US 9,563,827 B2
(45) Date of Patent: Feb. 7, 2017

(54) IMAGE PROCESSING APPARATUS, IMAGE PROCESSING METHOD, AND IMAGE PROCESSING SYSTEM FOR GENERATING CLEAR TONER PLANE DATA

(71) Applicants: Naoya Awamura, Kanagawa (JP); Hiroaki Suzuki, Chiba (JP)

(72) Inventors: Naoya Awamura, Kanagawa (JP); Hiroaki Suzuki, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/827,580

(22) Filed: Aug. 17, 2015

(65) Prior Publication Data

US 2016/0048747 A1 Feb. 18, 2016

(30) Foreign Application Priority Data

Aug. 18, 2014 (JP) .................................. 2014-166159
Jul. 31, 2015 (JP) .................................. 2015-152938

(51) Int. Cl.
G06K 15/02 (2006.01)

(52) U.S. Cl.
CPC ... G06K 15/1867 (2013.01); *G03G 2215/0081* (2013.01); *G06K 15/1868* (2013.01)

(58) Field of Classification Search
None
See application file for complete search history.

(56) References Cited

U.S. PATENT DOCUMENTS

| 9,036,208 B2 * | 5/2015 | Tokushima | ........ G03G 15/6585 358/1.1 |
| 2010/0134811 A1 * | 6/2010 | Fukasawa | ................ H04N 1/58 358/1.9 |
| 2011/0038654 A1 * | 2/2011 | Yamada | ............. G03G 15/6585 399/341 |
| 2012/0063802 A1 * | 3/2012 | Suzuki | ............... G03G 15/6585 399/82 |
| 2012/0237244 A1 * | 9/2012 | Yoshikawa | ........ G03G 15/6585 399/67 |

(Continued)

FOREIGN PATENT DOCUMENTS

| JP | 2012-212131 | 11/2012 |
| JP | 2013-256073 | 12/2013 |

*Primary Examiner* — Thomas D Lee
(74) *Attorney, Agent, or Firm* — Oblon, McClelland, Maier & Neustadt, L.L.P.

(57) ABSTRACT

An extractor extracts a gloss control value unused in first gloss control plane data. A conversion table generator generates a conversion table defining a special color density value corresponding to the extracted gloss control value. A second surface effect conversion table generator generates a second surface effect conversion table obtained by registering, in the first surface effect conversion table, definition information for the special color image specified by the special color density value in the conversion table in association with the gloss control values in the conversion table. A second gloss control plane data generator generates second gloss control plane data in which the special color density value in the clear plane data is converted into the corresponding gloss control value in the conversion table. A clear toner plane generator generates the clear toner plane data based on the second surface effect conversion table and third gloss control plane data.

14 Claims, 16 Drawing Sheets

(56) References Cited

U.S. PATENT DOCUMENTS

2013/0278952 A1\* 10/2013 Suzuki .................. G06K 15/02
 358/1.9
2015/0104210 A1  4/2015 Yoshikawa et al.

\* cited by examiner

COLOR PLANE DATA

| TYPE OF SURFACE EFFECT | GLOSSINESS | DEVIATION |
|---|---|---|
| PREMIUM GLOSS (PG) | Gs≥80 | ΔGs≤10 |
| GLOSS (G) | Gs=Gs (GLOSS) | ΔGs≤10 |
| MATT (M) | Gs=Gs (1C30% DOT) | ΔGs≤10 |
| PREMIUM MATT (PM) | Gs≤10 | ΔGs≤10 |

FIRST GLOSS CONTROL PLANE DATA

▨ :REGION WHERE PG IS DESIGNATED
(GLOSS CONTROL VALUE 98%)

▧ :REGION WHERE G IS DESIGNATED
(GLOSS CONTROL VALUE 90%)

▤ :REGION WHERE M IS DESIGNATED
(GLOSS CONTROL VALUE 16%)

CLEAR PLANE DATA

| TYPE OF SURFACE EFFECT | GLOSS CONTROL VALUE (%) |
|---|---|
| PG | 98% |
| G | 90% |
| M | 16% |
| PM | 6% |

| DRAWN OBJECT | COORDINATE | GLOSS CONTROL VALUE |
|---|---|---|
| A, B, C | (x1, y1)-(x2, y2) | 98% |
| (RECTANGULAR PICTURE) | (x3, y3)-(x4, y4) | 90% |
| ... | ... | ... |

FIG.12

| GLOSS CONTROL RATE (%) | GLOSS CONTROL VALUE | | TYPE OF SURFACE EFFECT | GLOSSER ON/OFF (ON/OFF INFORMATION) | CLEAR TONER PLANE 1 | CLEAR TONER PLANE 2 |
|---|---|---|---|---|---|---|
| | REPRESEN-TATIVE VALUE | NUMERAL RANGE | | | | |
| 98% | 250 | 248 255 | PREMIUM GLOSS TYPE A | ON | INVERSE MASK A | no data |
| 96% | 245 | 243 247 | PREMIUM GLOSS TYPE B | ON | INVERSE MASK B | no data |
| 94% | 240 | 238 242 | PREMIUM GLOSS TYPE C | ON | INVERSE MASK C | no data |
| 92% | 235 | 233 237 | RESERVED | | | |
| 90% | 230 | 228 232 | GLOSS TYPE 1 | OFF | INVERSE MASK 1 | no data |
| 88% | 224 | 222 227 | GLOSS TYPE 2 | OFF | INVERSE MASK 2 | no data |
| 86% | 219 | 217 221 | GLOSS TYPE 3 | OFF | INVERSE MASK 3 | no data |
| 84% | 214 | 212 216 | GLOSS TYPE 4 | OFF | INVERSE MASK 4 | no data |
| 82% | 209 | 207 211 | RESERVED | | | |
| 80% | 204 | 202 206 | | | | |
| 79% | 199 | 197 201 | | | | |
| 78% | 194 | 192 196 | | | | |
| 77% | 189 | 187 191 | | | | |
| 76% | 184 | 182 186 | | | | |
| 75% | 179 | 177 181 | | | | |
| 74% | 174 | 172 176 | | | | |
| 73% | 169 | 167 171 | | | | |
| 72% | 164 | 162 166 | | | | |
| 71% | 159 | 157 161 | | | | |
| 46% | 117 | 115 119 | RESERVED | | | |
| 44% | 112 | 110 114 | WATERMARK 3 (XXX) | OFF | no data | TILE TEXT 3 |
| 42% | 107 | 105 109 | WATERMARK 2 (COPY PROHIBITED) | | no data | TILE TEXT 2 |
| 40% | 102 | 100 104 | WATERMARK (SPECIMEN) | | no data | TILE TEXT 1 |
| 38% | 97 | 95 99 | RESERVED | | | |
| 36% | 92 | 90 94 | RESERVED | | | |
| 34% | 87 | 85 89 | WOVEN PATTERN 3 (XXX) | | no data | TILE WOVEN PATTERN 3 |
| 32% | 82 | 80 84 | WOVEN PATTERN 2 (LATTICE) | | no data | TILE WOVEN PATTERN 2 |
| 30% | 76 | 74 79 | WOVEN PATTERN 1 (WAVE) | | no data | TILE WOVEN PATTERN 1 |
| 28% | 71 | 69 73 | RESERVED | | | |
| 26% | 66 | 64 68 | RESERVED | | | |
| 24% | 61 | 59 63 | TACTILE PATTERN TYPE 3 (ROUGH) | | no data | TILE DOT PATTERN 3 |
| 22% | 56 | 54 58 | TACTILE PATTERN TYPE 2 (MEDIUM) | | no data | TILE DOT PATTERN 2 |
| 20% | 51 | 49 53 | TACTILE PATTERN TYPE 1 (FINE) | | no data | TILE DOT PATTERN 1 |
| 18% | 46 | 44 48 | RESERVED | | | |
| 16% | 41 | 39 43 | MATT TYPE 4 | OFF | HALFTONE 4 | no data |
| 14% | 36 | 34 38 | MATT TYPE 3 | OFF | HALFTONE 3 | no data |
| 12% | 31 | 29 33 | MATT TYPE 2 | OFF | HALFTONE 2 | no data |
| 10% | 25 | 23 28 | MATT TYPE 1 | OFF | HALFTONE 1 | no data |
| 8% | 20 | 18 22 | RESERVED | | | |
| 6% | 15 | 13 17 | PREMIUM MATT TYPE C | ON & OFF | no data | SOLID |
| 4% | 10 | 8 12 | PREMIUM MATT TYPE B | ON & OFF | no data | SOLID |
| 2% | 5 | 1 7 | PREMIUM MATT TYPE A | ON & OFF | no data | SOLID |
| 0% | 0 | 0 0 | NONE | OFF | no data | no data |

FIG.14

| SPECIAL COLOR DENSITY VALUE (SPECIAL COLOR DENSITY REPRESENTATIVE VALUE) | 0 | 12 | 16 | 18 | ... | 96 | 100 |
|---|---|---|---|---|---|---|---|
| GLOSS CONTROL VALUE | 0 | 71 | 72 | 73 | ... | 79 | 80 |

UNIT: %

FIG.15

| GLOSS CONTROL RATE (%) | GLOSS CONTROL VALUE | | | TYPE OF SURFACE EFFECT | GLOSSER ON/OFF (ON/OFF INFORMATION) | CLEAR TONER PLANE 1 | CLEAR TONER PLANE 2 |
|---|---|---|---|---|---|---|---|
| | REPRESENTATIVE VALUE | NUMERAL RANGE | | | | | |
| 98% | 250 | 248 | 255 | PREMIUM GLOSS TYPE A | ON | INVERSE MASK A | no data |
| 96% | 245 | 243 | 247 | PREMIUM GLOSS TYPE B | ON | INVERSE MASK B | no data |
| 94% | 240 | 238 | 242 | PREMIUM GLOSS TYPE C | ON | INVERSE MASK C | no data |
| 92% | 235 | 233 | 237 | RESERVED | | | |
| 90% | 230 | 228 | 232 | GLOSS TYPE 1 | OFF | INVERSE MASK 1 | no data |
| 88% | 224 | 222 | 227 | GLOSS TYPE 2 | OFF | INVERSE MASK 2 | no data |
| 86% | 219 | 217 | 221 | GLOSS TYPE 3 | OFF | INVERSE MASK 3 | no data |
| 84% | 214 | 212 | 216 | GLOSS TYPE 4 | OFF | INVERSE MASK 4 | no data |
| 82% | 209 | 207 | 211 | RESERVED | | | |
| 80% | 204 | 202 | 206 | FOR CLEAR PLANE CONVERSION | OFF | no data | HALFTONE (100%) |
| 79% | 199 | 197 | 201 | FOR CLEAR PLANE CONVERSION | OFF | no data | HALFTONE (96%) |
| 78% | 194 | 192 | 196 | FOR CLEAR PLANE CONVERSION | OFF | no data | HALFTONE (84%) |
| 77% | 189 | 187 | 191 | FOR CLEAR PLANE CONVERSION | OFF | no data | HALFTONE (80%) |
| 76% | 184 | 182 | 186 | FOR CLEAR PLANE CONVERSION | OFF | no data | HALFTONE (76%) |
| 75% | 179 | 177 | 181 | FOR CLEAR PLANE CONVERSION | OFF | no data | HALFTONE (72%) |
| 74% | 174 | 172 | 176 | FOR CLEAR PLANE CONVERSION | OFF | no data | HALFTONE (44%) |
| 73% | 169 | 167 | 171 | FOR CLEAR PLANE CONVERSION | OFF | no data | HALFTONE (18%) |
| 72% | 164 | 162 | 166 | FOR CLEAR PLANE CONVERSION | OFF | no data | HALFTONE (16%) |
| 71% | 159 | 157 | 161 | FOR CLEAR PLANE CONVERSION | OFF | no data | HALFTONE (12%) |
| 46% | 117 | 115 | 119 | RESERVED | | | |
| 44% | 112 | 110 | 114 | WATERMARK 3 (XXX) | OFF | no data | TILE TEXT 3 |
| 42% | 107 | 105 | 109 | WATERMARK 2 (COPY PROHIBITED) | | no data | TILE TEXT 2 |
| 40% | 102 | 100 | 104 | WATERMARK (SPECIMEN) | | no data | TILE TEXT 1 |
| 38% | 97 | 95 | 99 | RESERVED | | | |
| 36% | 92 | 90 | 94 | RESERVED | | | |
| 34% | 87 | 85 | 89 | WOVEN PATTERN 3 (XXX) | | no data | TILE WOVEN PATTERN 3 |
| 32% | 82 | 80 | 84 | WOVEN PATTERN 2 (LATTICE) | | no data | TILE WOVEN PATTERN 2 |
| 30% | 76 | 74 | 79 | WOVEN PATTERN 1 (WAVE) | | no data | TILE WOVEN PATTERN 1 |
| 28% | 71 | 69 | 73 | RESERVED | | | |
| 26% | 66 | 64 | 68 | RESERVED | | | |
| 24% | 61 | 59 | 63 | TACTILE PATTERN TYPE 3 (ROUGH) | | no data | TILE DOT PATTERN 3 |
| 22% | 56 | 54 | 58 | TACTILE PATTERN TYPE 2 (MEDIUM) | | no data | TILE DOT PATTERN 2 |
| 20% | 51 | 49 | 53 | TACTILE PATTERN TYPE 1 (FINE) | | no data | TILE DOT PATTERN 1 |
| 18% | 46 | 44 | 48 | RESERVED | | | |
| 16% | 41 | 39 | 43 | MATT TYPE 4 | OFF | HALFTONE 4 | no data |
| 14% | 36 | 34 | 38 | MATT TYPE 3 | OFF | HALFTONE 3 | no data |
| 12% | 31 | 29 | 33 | MATT TYPE 2 | OFF | HALFTONE 2 | no data |
| 10% | 25 | 23 | 28 | MATT TYPE 1 | OFF | HALFTONE 1 | no data |
| 8% | 20 | 18 | 22 | RESERVED | | | |
| 6% | 15 | 13 | 17 | PREMIUM MATT TYPE C | ON & OFF | no data | SOLID |
| 4% | 10 | 8 | 12 | PREMIUM MATT TYPE B | ON & OFF | no data | SOLID |
| 2% | 5 | 1 | 7 | PREMIUM MATT TYPE A | ON & OFF | no data | SOLID |
| 0% | 0 | 0 | 0 | FOR CLEAR PLANE CONVERSION | OFF | no data | HALFTONE (0%) |

IMAGE PROCESSING APPARATUS, IMAGE PROCESSING METHOD, AND IMAGE PROCESSING SYSTEM FOR GENERATING CLEAR TONER PLANE DATA

CROSS-REFERENCE TO RELATED APPLICATIONS

The present application claims priority to and incorporates by reference the entire contents of Japanese Patent Application No. 2014-166159 filed in Japan on Aug. 18, 2014 and Japanese Patent Application No. 2015-152938 filed in Japan on Jul. 31, 2015.

BACKGROUND OF THE INVENTION

1. Field of the Invention

The present invention relates to an image processing apparatus, an image processing method, and an image processing system.

2. Description of the Related Art

There have been known apparatuses that form an image by the use of, in addition to C, M, Y, and K or other color toners, a toner in a special color. In one known technique (see, for example, Japanese Patent Application Laid-open No. 2012-212131), a special color toner is used to provide a surface effect such as gloss on a recording medium.

Japanese Patent Application Laid-open No. 2012-212131 discloses a printing system for generating clear toner plane data used in a printing machine from clear plane data and gloss control plane data. The clear plane data is data for forming a transparent image. The gloss control plane data is data for designating the type of a surface effect and a region to which the surface effect is to be applied.

However, to generate the clear toner plane data according to the conventional technique, it has been necessary to process two types of planes (two types of pieces of data), the gloss control plane data and the clear plane data. Consequently, in the conventional technique, a memory capacity is consumed or processing speed is dropped when the clear toner plane data is generated. In addition, a user suffers a load when the user makes an operation to integrate the clear toner plane data and the gloss control plane data. Thus, in the conventional technique, the processing load has been large for generation of the clear toner plane data.

SUMMARY OF THE INVENTION

It is an object of the present invention to at least partially solve the problems in the conventional technology.

According to an embodiment, an image processing apparatus includes an acquirer, a storage, an extractor, a conversion table generator, a second surface effect conversion table generator, a second gloss control plane data generator, an integration unit, and a clear toner plane generator. The acquirer acquires first gloss control plane data and clear plane data. The first gloss control plane data defines a gloss control value that specifies a type of visual or tactile surface effect on a recording medium and a region on the recording medium to which the surface effect is to be applied. The clear plane data defines a special color density value that specifies a special color image other than the surface effect. The storage stores therein a first surface effect conversion table in which the gloss control value, the type of surface effect, and definition information of clear toner plane data used in an executer to apply a special color toner on the recording medium in accordance with the clear toner plane data are associated with each other. The extractor extracts the gloss control value unused in the first gloss control plane data. The conversion table generator generates a conversion table defining the special color density value corresponding to the extracted gloss control value. The second surface effect conversion table generator generates a second surface effect conversion table obtained by registering, in the first surface effect conversion table, definition information corresponding to the special color image specified by the special color density value in the conversion table in association with the gloss control values in the conversion table. The second gloss control plane data generator generates second gloss control plane data in which the special color density value in the clear plane data is converted into the corresponding gloss control value in the conversion table. The integration unit integrates the first gloss control plane data and the second gloss control plane data to generate third gloss control plane data. The clear toner plane generator generates the clear toner plane data based on the second surface effect conversion table and the third gloss control plane data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a table illustrating an example of the data format of a first surface effect conversion table;

FIG. 14 is a table illustrating an example of the data configuration of a conversion table;

FIG. 15 is a table illustrating an example of a second surface effect conversion table;

DETAILED DESCRIPTION OF THE PREFERRED EMBODIMENTS

Exemplary embodiments of an image processing apparatus, an image processing method, and an image processing system are hereinafter described in details with reference to the attached drawings.

First Embodiment

First, the configuration of an image processing system according to a first embodiment is described.

Figure 1:
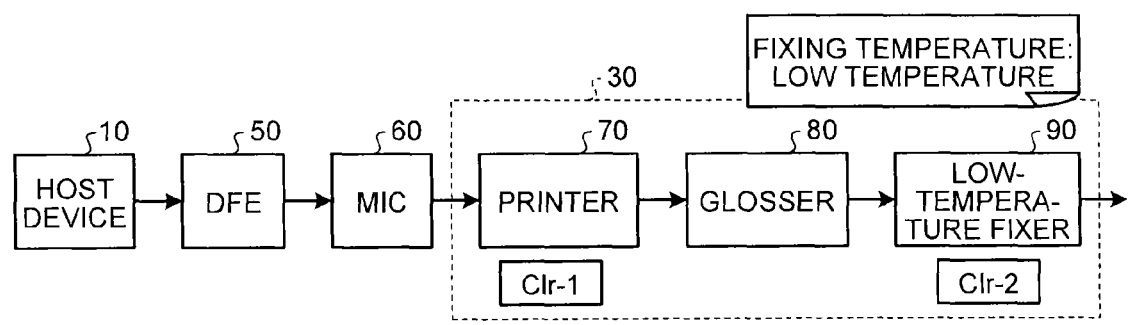
FIG. 1 is a diagram illustrating an example of the configuration of an image processing system.

FIG. 1 illustrates an example of the configuration of the image processing system according to the first embodiment. In the first embodiment, the image processing system includes an image processing apparatus (DFE: Digital Front End) 50 (hereinafter referred to as "DFE 50", which corresponds to an image processing apparatus), an interface controller (MIC: Mechanism I/F Controller) 60 (hereinafter referred to as "MIC 60"), a printer 70, and a glosser 80 and a low-temperature fixer 90, which serve as a post-processor. The DFE 50, the MIC 60, the printer 70, the glosser 80, and the low-temperature fixer 90 are connected to each other in this configuration.

The DFE 50 communicates with the printer 70 through the MIC 60 to control the image formation in the printer 70.

The DFE 50 is connected to a host device 10 typified by a personal computer (PC). The DFE 50 receives print data from the host device 10, generates output data, and transmits the output data to the printer 70 through the MIC 60. The printer 70 has at least C, M, Y, and K color toners and a special color toner mounted therein. Each of these toners is provided with an image formation unit including a photoconductor, a charging device, a developing device, and a photoconductor cleaner, an exposing device, and a fixer. Based on the received output data, the printer 70 forms toner images on a recording medium with the C, M, Y, and K color toners and the special color toner.

In the first embodiment, the printer 70, the glosser 80, and the low-temperature fixer 90 constitute a printing machine 30. At least one of the printer 70 and the low-temperature fixer 90 corresponds to an executer that executes the image formation. The executer executes the image formation by applying the special color toner and the color toners on the recording medium. In this embodiment, the printing machine 30 is described as corresponding to the executer.

The special color toner means a toner used for providing a surface effect on the recording medium or for forming a special color image on the recording medium. Examples of the special color toner include a transparent (colorless) toner and a white toner. A transparent (colorless) toner means, for example, a toner with transmittance of 70% or more. The first embodiment will describe an example of using a transparent toner as the special color toner. A white toner may alternatively be used as the special color toner.

In accordance with the image data transmitted from the DFE 50 through the MIC 60, the photoconductor is irradiated with a beam emitted from the exposing device and the printer 70 thus forms the toner images with the toners on the photoconductor. The toner images are transferred onto the recording medium and fixed by the fixer through heating and pressing at a temperature within a certain range (normal temperature). This operation forms an image on the recording medium. The configuration of the printer 70 as above is well known and the detailed description is therefore omitted. The recording medium may be any medium on which images can be formed. Examples of the recording medium include known paper media (sheet), synthetic paper, and vinyl paper.

The glosser 80 is turned on or off by on/off information specified by the DFE 50. The glosser 80 having been turned on presses the image, which is formed on the recording medium by the printer 70, under high temperature and high pressure. After that, the recording image is cooled with the image formed thereon and is separated from the main body. This operation can compress the toner applied in an excessive amount on the pixels in the entire image formed on the recording medium, thereby homogenizing the total amount of applied toners over the entire pixels.

The low-temperature fixer 90 has the image formation unit, which includes a photoconductor for a special color toner, a charging device, a developing device, and a photoconductor cleaner, an exposing device, and a fixer for fixing the special color toner. The low-temperature fixer 90 receives the input of clear toner plane data, which will be described below, generated by the DFE 50 for use in the low-temperature fixer 90. Upon the reception of the clear toner plane data to be used in the low-temperature fixer 90 from the DFE 50, the low-temperature fixer 90 forms the toner image in the special color toner using the received data, overlaps the toner image on the recording medium pressed by the glosser 80, and applies heat and pressure that are lower than normal heat and pressure to fix the image on the recording medium.

Now, a description is made of the print data output from the host device 10 to the DFE 50.

The host device 10 generates the print data by the preinstalled image processing application, and transmits the data to the DFE 50. The image processing application can handle image data of the special color plane relative to image data of color planes such as the RGB color plane or the CMYK color plane with color density values defined pixel by pixel. The special color plane means image data used for applying the toner or ink in a special color such as white, gold, or silver other than the basic colors such as CMYK and RGB, and also means data intended for a printer including the toner or ink in such a special color. The special color plane may have R in addition to the basic colors of CMYK or have Y in addition to the basic colors of RGB for higher color reproducibility. A clear toner is usually treated as one special color.

In the present embodiment, the special color toner is used for providing a visual or tactile surface effect on the recording medium and for forming a special color image on the recording medium. The special color image is an image obtained by applying the special color toner on the recording medium other than the above surface effect. Examples of the special color image include a watermark and texture. A watermark is an image used for indicating copyright. Texture is, for example, a dot image.

Based on the input image data, the image processing application of the host device 10 generates color plane data and also generates gloss control plane data and clear plane data as the image data for the special color plane upon the user's instruction.

The color plane data is described here. The color plane data means image data in colors such as RGB or CMYK with color density values defined pixel by pixel. The color plane data expresses one pixel in 8 bits. Thus, in the color plane data, the color and the density specified by the user are defined for each pixel.

Figure 2:
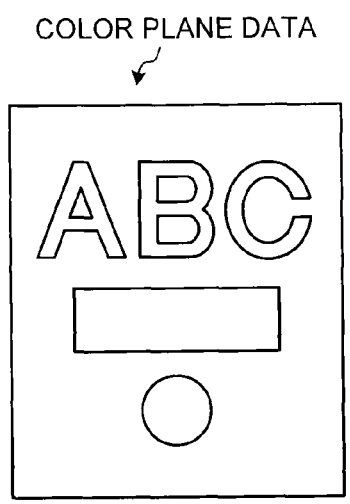
FIG. 2 is an explanatory view illustrating an example of color plane data.

FIG. 2 is an explanatory view illustrating an example of the color plane data. In FIG. 2, the density value of the color designated by the user in the image processing application is assigned to each of the drawn objects including "A", "B", and "C".

Next, the gloss control plane data is described. The gloss control plane data means data in which the gloss control value is defined. The gloss control value specifies the type of visual or tactile surface effect on the recording medium and the region on the recording medium to which the surface effect is to be applied.

The gloss control plane data included in the print data received by the DFE 50 from the host device 10 is referred to as first gloss control plane data.

The first gloss control plane data is represented by gloss control values ranging from "0" to "255" in 8 bits for each pixel. The gloss control values are associated with the types of surface effects (the gloss control values may be represented in 16 bits or 32 bits, or in percentage). For the range to provide the same type of surface effect, the same value is assigned regardless of the density of the special color toner to be applied in fact. This makes it possible to specify the region easily from the image data as required even in the absence of the data designating the region. The first gloss control plane data represents the type of surface effect and the effect region to which the surface effect is to be applied. The first gloss control plane data may additionally have data representing the region to which the surface effect is to be applied.

The host device 10 sets the type of surface effect for the drawn object designated by the user in the image processing application as the gloss control value for each drawn object, and thus generates the first gloss control plane data in the vector format.

The pixels included in the first gloss control plane data correspond to the pixels in the color plane data. The color plane data and the first gloss control plane data are configured in unit of pages.

Figures 3, 4:
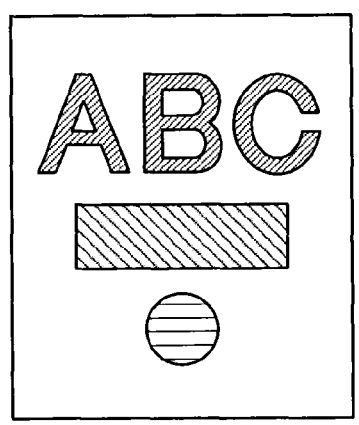
FIG. 3 is a table illustrating some types of surface effects.
FIG. 4 is an explanatory view illustrating an example of first gloss control plane data.

The types of surface effects include glossiness, surface protection, watermark containing information, and texture. The surface effect regarding the glossiness is roughly classified into four types, as illustrated in FIG. 3, in the following order of high-to-low gloss degrees (glossiness): premium gloss (PG), gloss (G), matt (M), and premium matt (PM). The premium gloss may hereinafter be referred to as "PG", the gloss as "G", the matt as "M", and the premium matt as "PM".

The premium gloss and the gloss provide a high degree of glossiness, while the matt and the premium matt are to suppress the glossiness. The premium matt is to lower the degree of glossiness than the glossiness of a typical recording medium. In FIG. 3, the premium gloss has a glossiness Gs of 80 or more, the gloss has a solid glossiness of the primary color or the secondary color, the matt has a glossiness of 30% of the primary color in dots, and the premium matt has a glossiness of 10 or less.

The deviation of the glossiness is represented by ΔGs and is set to 10 or less. For each type of such surface effects, a higher gloss control value is associated with the surface effect with a higher glossiness and a lower gloss control value is associated with the surface effect with a lower glossiness. An intermediate gloss control value is associated with the surface effect of the watermark or texture. The watermark includes, for example, text or a woven pattern. The texture represents text or a pattern with a visual or tactile effect. For example, a pattern of stained glass can be achieved by the clear toner. The surface protection can be achieved by the premium gloss or the gloss.

With the image processing application, the user designates which region on the image expressed by the image data to be processed has the surface effect and what type of surface effect is applied to that region. The host device 10 that executes the image processing application generates the first gloss control plane data in which the region to which the surface effect is to be applied and the type of surface effect are specified. Specifically, the first gloss control plane data is generated by setting the gloss control value corresponding to the surface effect designated by the user in regard to the drawn object constituting the region specified by the user. The relation between the gloss control value and the type of surface effect will be described below.

FIG. 4 is an explanatory view illustrating an example of the first gloss control plane data. In the example of the first gloss control plane data in FIG. 4, the user applies the surface effect "PG (premium gloss)" to the drawn object "ABC", the surface effect "G (gloss)" on the drawn object "rectangular picture", and the surface effect "M (matt)" on the drawn object "circular picture". The gloss control value set for each surface effect is determined in accordance with the type of surface effect in a density value selection table (see FIG. 6), which will be described below.

Next, the clear plane data is described. The clear plane data corresponds to the image data in which a designated particular density value is defined that specifies the special color image for effects other than the above surface effect, such as a watermark or texture. A special color density value is information indicating an amount of the special color toner to be applied, and also is information used for specifying the special color image such as a watermark or texture.

Figures 5, 6:
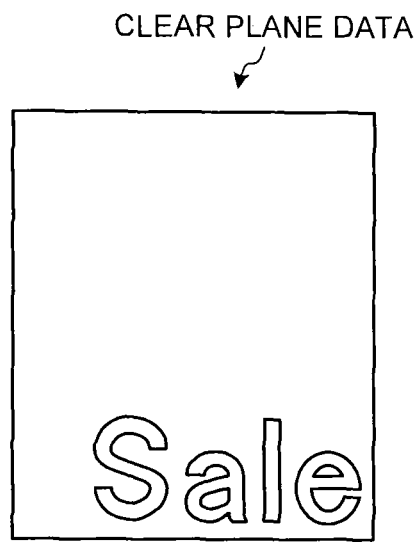
FIG. 5 is an explanatory view illustrating an example of clear plane data.
FIG. 6 is a table illustrating an example of a density value selection table.

FIG. 5 is an explanatory view illustrating an example of the clear plane data. In the example of FIG. 5, the user has designated the watermark "Sale". For the watermark, the special color density value in accordance with the density value of the watermark (the amount of special color toner to be applied) is designated.

The first gloss control plane data and the clear plane data are formed by a plane different from the color plane data by the image processing application of the host device 10. The color plane data, the first gloss control plane data, and the clear plane data are formed in, for example, the portable document format (PDF) and the print data combining the image data of those planes in PDF are formed. The data format of the image data planes is not limited to PDF but may be any other format.

The image processing application of the host device 10 generates the first gloss control plane data by converting the type of the user-designated surface effect into the gloss control value. This conversion is made with reference to the density value selection table stored in the storage of the host device 10.

The density value selection table is a table containing data associating the type of surface effect with the gloss control value of the first gloss control plane data corresponding to the type of surface effect.

FIG. 6 is a table illustrating an example of the density value selection table. In the example of FIG. 6, the gloss control value for the region designated as "PG" (premium gloss) by the user is a pixel value corresponding to 98%, the gloss control value for the region designated as "G" (gloss) by the user is a pixel value corresponding to 90%, the gloss control value for the region designated as "M" (matt) by the user is a pixel value corresponding to 16%, and the gloss control value for the region designated as "PM" (premium matt) by the user is a pixel value corresponding to 6%.

The relation between the type of surface effect and the gloss control value stored in the density value selection table is the same as the relation between the type of surface effect and the gloss control value in a first surface effect conversion table (which will be described below in detail) stored in the DFE 50.

The controller of the host device 10 acquires the first surface effect conversion table from the printing machine 30 at a certain timing, generates (copies) a density value selection table from the acquired first surface effect conversion table, and saves the table in the storage. FIG. 6 illustrates the simplified example of the density value selection table. The relation between the gloss control value and the type of surface effect defined in the density value selection table is the same as the relation between the gloss control value and the type of surface effect defined in the first surface effect conversion table described below.

The first surface effect conversion table may be saved in a storage server (cloud) on a network such as the Internet. In this case, the controller of the host device 10 may acquire the first surface effect conversion table from the server and generates (copies) the density value selection table from the acquired first surface effect conversion table. It is noted that the relation between the type of surface effect and the gloss control value needs to be the same in the first surface effect conversion table stored in the DFE 50 and in the density value selection table saved in the storage of the host device 10.

In the image processing application of the host device 10, the user designates a certain surface effect for the drawn object (i.e., the effect region to which the surface effect is to be applied). The image processing application then sets the gloss control value corresponding to the designated type of surface effect in the drawn object with reference to the density value selection table in FIG. 6. Thus, the image processing application generates the first gloss control plane data. For example, the user sets "PG" for the region to display "ABC", "G" for the rectangular region, and "M" for the circular region in the target image corresponding to the color plane data illustrated in FIG. 2. In this case, with reference to the density value selection table, the host device 10 generates the first gloss control plane data by setting the gloss control values as follows: the gloss control value of the drawn object ("ABC") for which the user has designated "PG" is set to the pixel value corresponding to "98%"; the gloss control value of the drawn object ("rectangle") for which the user has designated "G" is set to the pixel value corresponding to "90%"; and the gloss control value of the drawn object ("circle") for which the user has designated "M" is set to the pixel value corresponding to "16%".

The first gloss control plane data generated in the host device 10 includes the coordinates of dots, parameters in the formulae for the lines connecting the coordinates or planes, and vector-format data represented as a group of drawn objects expressing paint or special color effects.

Figures 7, 8:
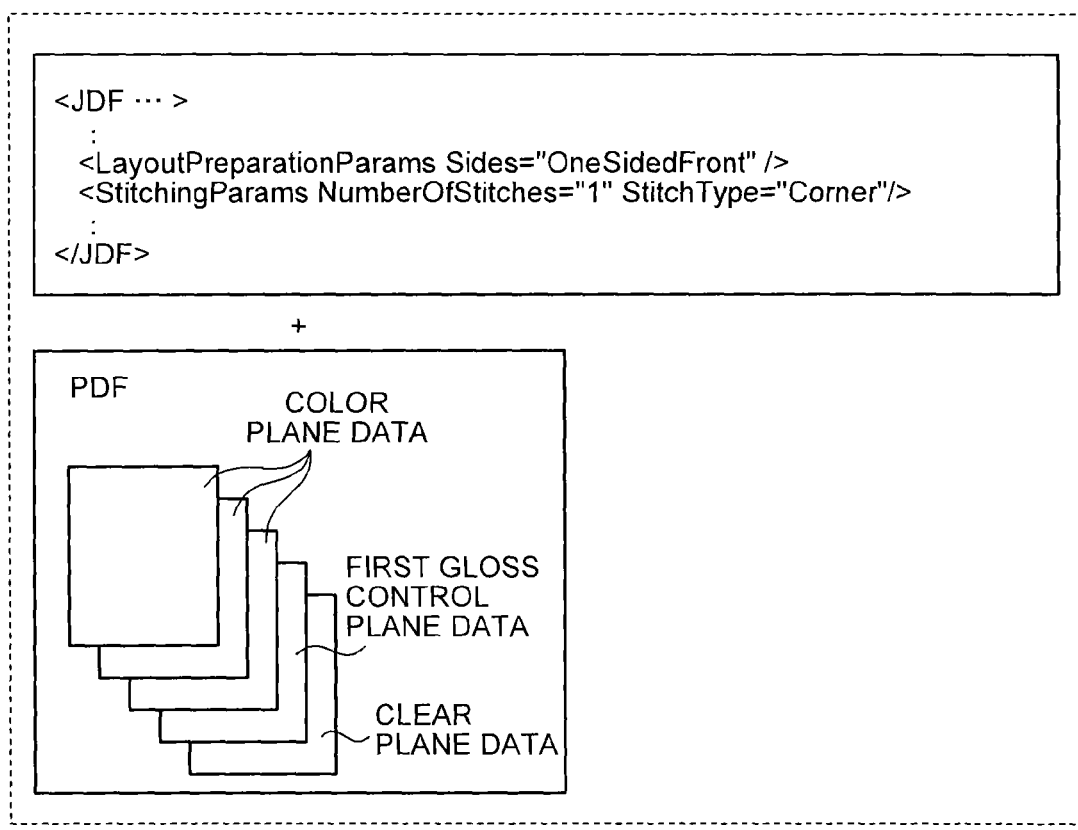
FIG. 7 is a table illustrating the correlation among drawn objects, coordinates, and density values.
FIG. 8 is a schematic diagram conceptually illustrating the configuration of print data.

FIG. 4 is a view conceptually illustrating the first gloss control plane data, and FIG. 7 is a table illustrating the relation among the drawn object, the coordinates, and the density value in the first gloss control plane data in FIG. 4.

The host device 10 generates the print data including the first gloss control plane data, the color plane data, the clear plane data, and a job command. Examples of the job command include the setting of the printer, the setting of the aggregation, and commands that order the printer to, for example, do duplex printing.

FIG. 8 is a schematic diagram conceptually illustrating the configuration of the print data. Job Definition Format (JDF) is used as the job command in the example of FIG. 8 but any other command may be used alternatively. JDF in FIG. 8 means a command that orders "one-sided printing/staple enabled" as the setting of the aggregation. The print data may be converted into a page description language (PDL) such as PostScript (registered trademark) or may be in the PDF format if the DFE 50 can handle this format.

Figure 9:
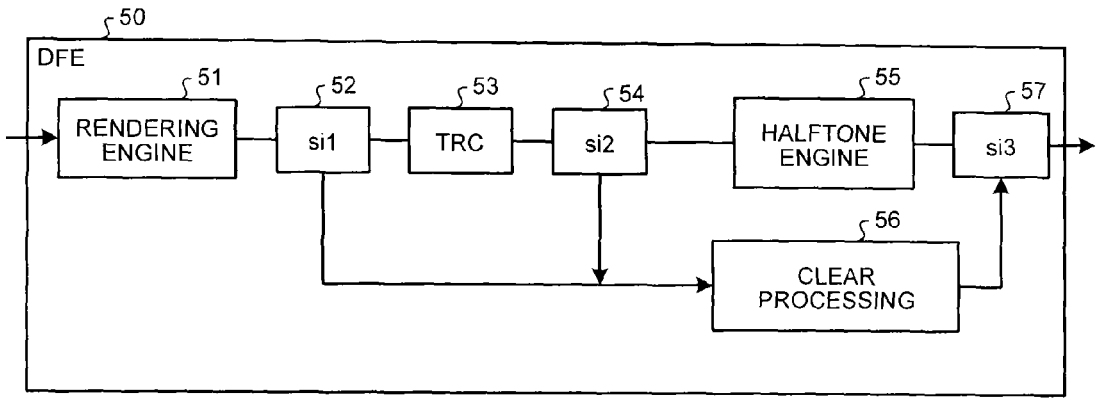
FIG. 9 is a block diagram illustrating the functional configuration of a DFE.

Next, the functional configuration of the DFE 50 is described. FIG. 9 is a block diagram illustrating the functional configuration of the DFE 50. The DFE 50 corresponds to the image processing apparatus.

The DFE 50 includes a rendering engine 51, an si1 52, a tone reproduction curve (TRC) 53, an si2 54, a halftone engine 55, a clear processing 56, and an si3 57.

The rendering engine 51, the si1 52, the tone reproduction curve 53, the si2 54, the halftone engine 55, the clear processing 56, and the si3 57 are implemented by the controller of the DFE 50 executing various computer programs stored in a main storage or an auxiliary storage.

The rendering engine 51, the si1 52, the TRC 53, the si2 54, the halftone engine 55, the clear processing 56, and the si3 57 may be entirely or partly implemented by, for example, a processing unit such as a central processing unit (CPU) executing programs, i.e., by using software. Alternatively, those units may be implemented by using hardware such as integrated circuits (ICs) or using both software and hardware.

Each of the si1 52, the si2 54, and the si3 57 has a function of separating image data and a function of integrating image data.

The rendering engine 51 receives the print data transmitted from the host device 10. The rendering engine 51 converts each piece of the first gloss control plane data, the clear plane data, and the color plane data included in the received print data from the vector format into the raster format. For the color plane data, the rendering engine 51 converts the color space expressed in the RGB format or the like into the color space expressed in the CMYK format.

The rendering engine 51 generates eight-bit CMYK color plane data, eight-bit clear plane data, and eight-bit first gloss control plane data and outputs the data to the si1 52. The eight-bit CMYK color plane data, the eight-bit clear plane data, and the eight-bit first gloss control plane data correspond to image data in which the pixel value of each pixel is expressed in 8 bits.

The rendering engine 51 generates the clear plane data in which the special color density value has been determined for each pixel. The rendering engine 51 further generates the first gloss control plane data in which the gloss control value is defined for each pixel. The rendering engine 51 further generates the color plane data in which the density value is defined for each pixel.

As a result, the clear plane data has the special color density value defined for each pixel. The first gloss control plane data has the gloss control value defined for each pixel. The color plane data has the density value defined for each pixel.

The si1 52 outputs the eight-bit CMYK color plane data to the TRC 53. The si1 52 outputs the eight-bit first gloss control plane data and the eight-bit clear plane data to the clear processing 56.

The TRC 53 receives the eight-bit CMYK color plane data from the si1 52. The TRC 53 performs image processing on the eight-bit CMYK color plane data, for example, performs gamma correction with a gamma curve of the 1D_LUT generated by calibration. Another example of the image processing is restricting the total amount of toner. Restricting the total amount corresponds to the process of restricting the data of the eight-bit color data for each of the CMYK colors after the gamma correction because the amount of toner printable by the printer 70 for one pixel on the recording medium has a limitation. Printing over that limitation would deteriorate the image quality due to the defective transfer or defective fixture. The present embodiment describes only the relevant gamma correction.

The si2 54 outputs the eight-bit CMYK color plane data after the gamma correction in the TRC 53 to the clear processing 56, where the eight-bit CMYK color plane data is used as the data for generating an inverse mask (which will be described below). The si2 54 outputs the eight-bit CMYK color plane data after the gamma correction to the halftone engine 55.

The halftone engine 55 receives the eight-bit CMYK color plane data after the gamma correction from the si2 54. The halftone engine 55 converts the received eight-bit CMYK color plane data into color plane data and outputs the converted data to the printer 70.

For example, the halftone engine 55 performs the halftone processing on the eight-bit CMYK color plane data after the gamma correction to convert the data into two-bit CMYK color plane data in which the pixel value of each pixel is expressed in 2 bits. The number of bits is not limited to two. The halftone engine 55 outputs the two-bit CMYK color plane data to the si3 57.

The clear processing 56 receives the eight-bit first gloss control plane data and the eight-bit clear plane data from the si1 52. The clear processing 56 receives the eight-bit CMYK color plane data after the gamma correction from the si2 54.

The clear processing 56 generates the clear toner plane data using the eight-bit first gloss control plane data, the eight-bit clear plane data, and the eight-bit CMYK color plane data after the gamma correction. The clear toner plane data corresponds to the data used for applying the special color toner on the printing machine 30 side. The details of the clear processing 56 will be described below. The clear processing 56 also generates the on/off information for turning on/off the glosser 80.

The clear processing 56 outputs the generated two-bit clear toner plane data and the on/off information for the glosser 80 to the si3 57. The si3 57 outputs the output data to the MIC 60 (see FIG. 1). The output data includes the two-bit CMYK color plane data received from the halftone engine 55, the two-bit clear toner plane data received from the clear processing 56, and the on/off information for the glosser 80.

Figure 10:
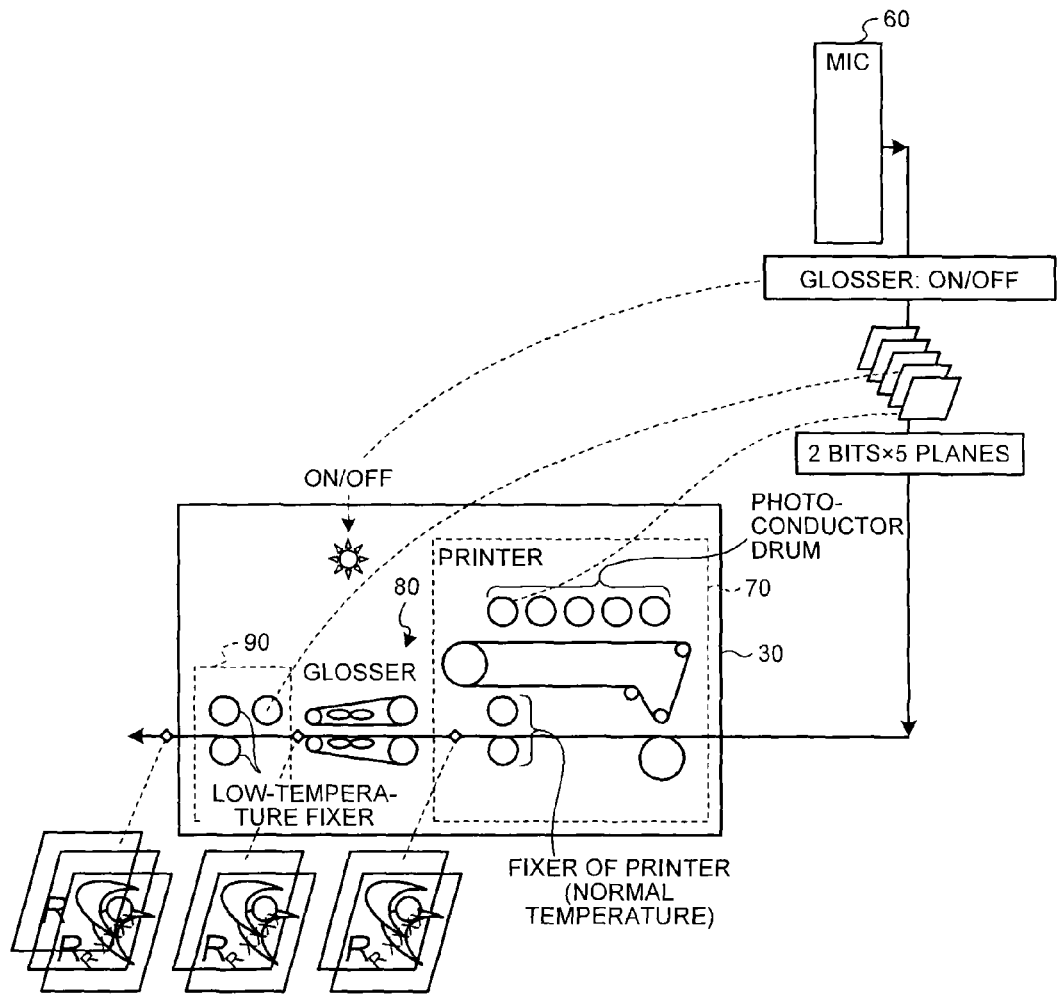
FIG. 10 a schematic diagram illustrating an MIC and a printing machine.

In FIG. 1, the MIC 60 outputs the output data to the printing machine 30. FIG. 10 is a schematic diagram illustrating the MIC 60 and the printing machine 30.

The MIC 60 assigns the color plane data and the clear toner plane data (specifically, the clear toner plane data for the printer 70 and the clear toner plane data for the low-temperature fixer 90) included in the received output data to the corresponding printer 70 and low-temperature fixer 90.

The MIC 60 turns on or off the glosser 80 in accordance with the on/off information included in the output data.

The printing machine 30 including the printer 70, the glosser 80, and the low-temperature fixer 90 has a conveying path that conveys the recording medium. The printer 70 specifically includes a plurality of electrophotography photoconductor drums, a transfer belt to which the toner image formed on the photoconductor drum is transferred, a transfer apparatus that transfers the toner image on the transfer belt onto the recording medium, and a fixer that fixes the toner image on the recording medium onto the recording medium. The recording medium is conveyed along the conveying path by a conveying member, which is not shown, in the order of the printer 70, the glosser 80, and the low-temperature fixer 90. The printer 70, the glosser 80, and the low-temperature fixer 90 perform the processes sequentially to form the image and provide the surface effect. Then, the recording medium is conveyed along the conveying path by a conveying mechanism, which is not shown, and discharged out of the printing machine 30.

Next, the details of the clear processing 56 are described.

Figure 11:
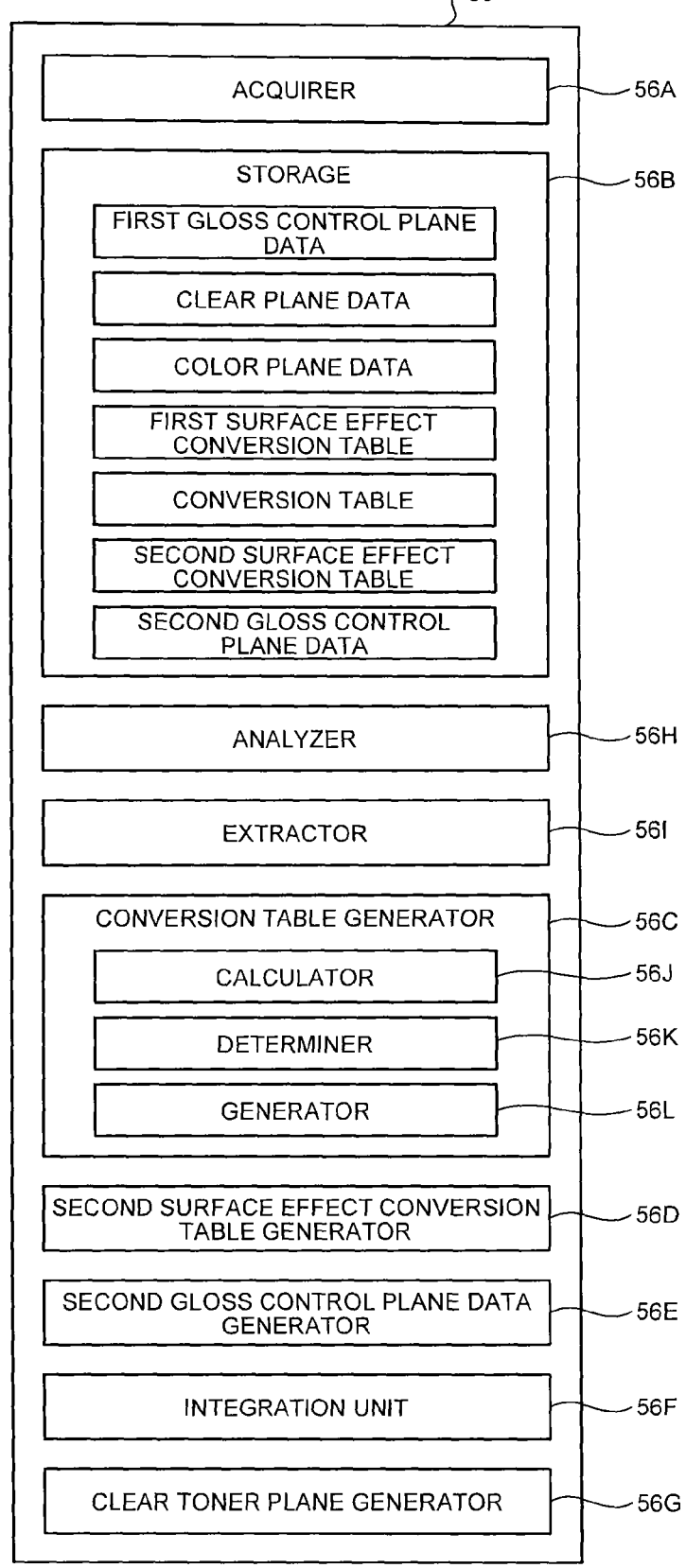
FIG. 11 is a block diagram illustrating the functions of a clear processing.

FIG. 11 is a block diagram illustrating the functions of the clear processing 56. The clear processing 56 includes an acquirer 56A, a storage 56B, an analyzer 56H, an extractor 56I, a conversion table generator 56C, a second surface effect conversion table generator 56D, a second gloss control plane data generator 56E, an integration unit 56F, and a clear toner plane generator 56G. The conversion table generator 56C includes a calculator 56J, a determiner 56K, and a generator 56L.

The acquirer 56A, the conversion table generator 56C, the second surface effect conversion table generator 56D, the second gloss control plane data generator 56E, the integration unit 56F, the clear toner plane generator 56G, the analyzer 56H, the extractor 56I, the calculator 56J, the determiner 56K, and the generator 56L may be entirely or partly implemented by, for example, a processing unit such as a CPU executing programs, i.e., by using software. Alternatively, those units may be implemented by using hardware such as integrated circuits (ICs) or using both software and hardware.

The acquirer 56A acquires the first gloss control plane data and the clear plane data. Specifically, the acquirer 56A acquires the eight-bit first gloss control plane data and the eight-bit clear plane data from the rendering engine 51.

The eight-bit first gloss control plane data corresponds to the image data in which the gloss control value is defined for designating the type of visual or tactile surface effect on the recording medium and the region on the recording medium to which the surface effect is to be applied as described above. The eight-bit clear plane data corresponds to the image data in which the special color density value is defined for designating the special color image other than the surface effect.

The acquirer 56A acquires the eight-bit CMYK color plane data after the gamma correction from the si2 54.

The acquirer 56A stores these pieces of data (eight-bit first gloss control plane data, eight-bit clear plane data, and eight-bit CMYK color plane data) in the storage 56B.

The storage 56B stores therein various pieces of data. In the present embodiment, the storage 56B stores therein the first surface effect conversion table.

In the first surface effect conversion table, the gloss control value, the type of surface effect, definition information, and the on/off information are associated with each other. The definition information indicates a type of an image to be formed with the special color toner by the executer (the printing machine 30 in this embodiment). Examples of the definition information include information indicating a tile character string, information indicating a tile mesh pattern, and information indicating a solid image. The definition information is not limited to these examples.

The on/off information indicates on/off of the glosser 80.

The first surface effect conversion table may be any table in which these pieces of data are associated with each other, and the data format is not limited to the table. For example, the first surface effect conversion table may be a database in which these pieces of data are associated with each other.

FIG. 12 is a table illustrating an example of the data format of the first surface effect conversion table.

As illustrated in FIG. 12, the first surface effect conversion table contains the gloss control value, the type of surface effect, the on/off information, and the definition information, which are associated with each other. In the description of the present embodiment, the definition information includes the definition information (see clear toner plane 1) used in the printer 70 and the definition information (see clear toner plane 2) used in the low-temperature fixer 90.

The on/off information and the definition information correspond to the control information of the printing machine 30.

Here, in the image processing system according to the present embodiment, which can have various configurations, the printer 70 is connected to the glosser 80 and the low-temperature fixer 90 serving as post-processors. The on/off information for turning on/off the glosser 80 corresponds to the control information for the glosser 80. The definition information (see clear toner plane 1) used in the printer 70 corresponds to the control information for the printer 70. The definition information (see clear toner plane 2) used in the low-temperature fixer 90 corresponds to the control information for the low-temperature fixer 90.

In the example of FIG. 12, the numeral range for each pixel value "6" when the gloss control value is represented by a numeral (0 to 255) in 8 bits, the representative value of each numeral range, and the value expressing the representative value in percentage are represented as the gloss control values. In regard to the value in percentage, the gloss control value "0" corresponds to "0%" and the gloss control value "255" corresponds to "100%".

Specifically, in the example of FIG. 12, the type of surface effect is associated for every range (every 6) of the gloss control values (0 to 255) represented in 8 bits in the first surface effect conversion table. The type of surface effect is associated with the proportion of the gloss control value calculated from the representative value of each range of the gloss control value for every 2%. The surface effect that provides the gloss (premium gloss and gloss) is associated with the range of the gloss control values ("212" to "255") where the percentage of the gloss control value (gloss control rate) is 84% or more. The surface effect that suppresses the gloss (matt and premium matt) is associated with the range of the gloss control values ("1" to "43") where the gloss control rate is 16% or less. The range of the gloss control values where the gloss control rate is 20% to 80% is associated with the surface effect such as texture or watermark.

More specifically, the premium gloss (PG) as the surface effect is associated with the pixel values from "238" to "255". Different types of premium gloss are associated with the three ranges of the gloss control values from "238" to "242", the gloss control values from "243" to "247", and the gloss control values from "248" to "255". The gloss control values from "212" to "232" are associated with the gloss (G). Specifically, different types of gloss are associated with the four ranges of the gloss control values from "212" to "216", the gloss control values from "217" to "221", the gloss control values from "222" to "227", and the gloss control values from "228" to "232". The gloss control values from "23" to "43" are associated with the matt (M). Specifically, different types of matt are associated with the four ranges of the gloss control values from "23" to "28", the gloss control values from "29" to "33", the gloss control values from "34" to "38", and the gloss control values from "39" to "43". The gloss control values from "1" to "17" are associated with the premium matt (PM). Specifically, different types of premium matt are associated with the three ranges of the gloss control values from "1" to "7", the gloss control values from "8" to "12", and the gloss control values from "13" to "17". The different types of the same surface effect come from the different formulae that calculate the clear toner plane data to be used in the printer 70 or the low-temperature fixer 90, but involve the same operation of the printing machine 30. The gloss control value "0" is associated with no surface effect.

In the example of FIG. 12, the first surface effect conversion table contains the on/off information for turning on/off the glosser 80, the definition information (see clear toner plane 1) used in the printer 70, and the definition information (see clear toner plane 2) used in the low-temperature fixer 90 in accordance with the gloss control value and the type of surface effect.

When the type of surface effect is the premium gloss, the glosser 80 is turned on, the clear toner plane data used in the printer 70 represents the inverse mask, and the clear toner plane data used in the low-temperature fixer 90 is absent. The inverse mask is obtained by, for example, Formula (1), which will be given below.

The inverse mask is to homogenize the total amount of C, M, Y, and K color toners and special color toner on the pixels included in the target region to which the surface effect is to be applied. Specifically, all the density values of the pixels included in the target region in the eight-bit CMYK color plane data are added up and this added value is subtracted from a certain value to provide image data. The obtained image data corresponds to the inverse mask.

The inverse mask is represented by, for example, Formula (1) below.

$$Clr=100-(C+M+Y+K) \qquad (1)$$

(where $Clr=0$ if $Clr<0$)

In Formula (1), Clr, C, M, Y, and K represent density rates obtained by the conversion of the density value of the pixels in regard to the special color toner and the C, M, Y, and K color toners, respectively.

With the use of Formula (1), the total amount of C, M, Y, and K color toners and special color toner is set to 100% for all the pixels included in the target region to which the surface effect is to be applied. If the total amount of C, M, Y, and K color toners is 100% or more, the special color toner is not applied and the density rate thereof is set to 0%. This is because the fixing process smooths a part where the total amount of C, M, Y, and K color toners is over 100%. By setting the total amount of toners in all the pixels included in the target region to which the surface effect is to be applied to be 100% or more, surface unevenness due to the varying amount of toners in the target region can be prevented and therefore regular reflection produces gloss.

Note that the inverse mask can be obtained by other formula than Formula (1) and there are various types of inverse masks.

An example of the inverse mask is to apply the special color toner uniformly in each pixel. This inverse mask is also called a solid mask, which is represented by Formula (2) below.

$$Clr=100 \qquad (2)$$

In Formula (2) and Formulae (3) and (4) described below, Clr represents the density rate of the special color toner obtained by the conversion from the density value in each pixel.

Some of the pixels to which the surface effect is to be applied may have other density rate than 100%, and there may be a plurality of types of solid masks.

Another example of the inverse mask is obtained by the multiplication of the surface exposure rate of each color. This inverse mask is represented by, for example, Formula (3) below.

$$Clr=100\times\{(100-C)/100\}\times\{(100-M)/100\}\times\{(100-Y)/100\}\times\{(100-K)/100\} \qquad (3)$$

In Formula (3), (100−C)/100 represents the surface exposure rate of C, (100−M)/100 represents the surface exposure rate of M, (100−Y)/100 represents the surface exposure rate of Y, and (100−K)/100 represents the surface exposure rate of K.

Another example of the inverse mask is obtained by assuming that a dot with the largest area rate regulates the smoothness. This inverse mask is represented by, for example, Formula (4) below.

$$Clr=100-\max(C,M,Y,K) \qquad (4)$$

In Formula (4), max(C, M, Y, K) represents that the density value of the color with the maximum density value among the CMYK colors corresponds to the representative value.

The inverse mask is a mask represented by any of the above Formulae (1) to (4).

FIG. 12 indicates that if the gloss control value is "228" to "232" and the type of surface effect is the gloss, the glosser 80 is turned off, the clear toner plane data (clear toner plane 1) used in the printer 70 is an inverse mask 1, and the clear toner plane data (clear toner plane 2) used in the low-temperature fixer 90 is absent.

The inverse mask 1 is a mask represented by any of the above Formulae (1) to (4). While the glosser 80 is off, the amount of toners to be smoothed varies. In this case, the surface becomes less even due to the premium gloss. As a result, the gloss with lower glossiness than the premium gloss is obtained. When the type of surface effect is the matt, the glosser 80 is turned off, the clear toner plane data (clear toner plane 1) used in the printer 70 represents the halftone (dots), and the clear toner plane data (clear toner plane 2) used in the low-temperature fixer 90 is absent. When the type of surface effect is the premium matt, the glosser 80 may be either on or off, the clear toner plane data (clear toner plane 1) used in the printer 70 is absent, and the clear toner plane data (clear toner plane 2) used in the low-temperature fixer 90 represents the solid mask. The solid mask is obtained by, for example, Formula (2) described above.

In FIG. 11, the analyzer 56H analyzes the eight-bit first gloss control plane data acquired by the acquirer 56A, and reads the gloss control value of each pixel.

The extractor 56I extracts the unused gloss control value in the eight-bit first gloss control plane data in accordance with the analysis result.

The extractor 56I preferably extracts the gloss control value unused in the eight-bit first gloss control plane data and the gloss control value that is not associated with the type of surface effect and the definition information in the first surface effect conversion table. Extracting these gloss control values enables the generation of the second gloss control plane data described below in which the gloss control value is more minutely set.

Hereinafter described is an example in which the extractor 56I extracts the gloss control value unused in the eight-bit first gloss control plane data and the gloss control value that is not associated with the type of surface effect and the definition information in the first surface effect conversion table.

The extractor 56I extracts, from among the possible gloss control values 0 to 255 in the eight-bit first gloss control plane data, a value that is unused as the gloss control value of each pixel in the first gloss control plane data in accordance with the analysis result. The extractor 56I extracts the gloss control value that is not associated with the type of surface effect and the definition information in the first surface effect conversion table stored in the storage 56B.

For example, the first surface effect conversion table in FIG. 12 is stored in the storage 56B. In FIG. 12, the type of surface effect and the definition information of the clear toner plane data are not associated with the numeral range of the gloss control values 157 to 206 (representative values 159 to 204, gloss control rate 71% to 80%) in the first surface effect conversion table (see the rectangular frame A in FIG. 12). In the first gloss control plane data acquired by the acquirer 56A, the gloss control values "1" to "255" (gloss control rate 1% to 100%) are defined and the gloss control value "0" (gloss control rate 0%) is not defined.

In this case, the extractor 56I extracts the gloss control value "0" (gloss control rate 0%) and the gloss control values "157" to "206" (representative values "159 to 204" and gloss control rate 71% to 80%).

In FIG. 11, the conversion table generator 56C generates a conversion table using the eight-bit first gloss control plane data acquired by the acquirer 56A and the eight-bit clear plane data acquired by the acquirer 56A.

The conversion table contains the information defining the relation between the gross control value that the extractor 56I has extracted from the first gloss control plane data, and the density value of the special color for designating the special color image in the clear plane data. In other words, the conversion table is a table for converting the density value of the special color defined by the clear plane data into the gloss control value.

The conversion table generator 56C includes the calculator 56J, the determiner 56K, and the generator 56L.

The calculator 56J calculates the number of control values of gloss control values (hereinafter referred to as the number N of control values (N is an integer of 1 or more)) extracted by the extractor 56I. The number of control values represents the number of extracted gloss control values. In the present embodiment, if the extracted gloss control values include continuous numerals, the range of the continuous numerals is sectioned for every predetermined numeral group.

For example, the calculator 56J sections the range of continuous numerals into an arbitrary number of groups. Each sectioned group contains at least one gloss control value (integer). The calculator 56J calculates the total of the number of sectioned groups and the number of discontinuous gloss control values as the number N of control values.

For example, the extractor 56I extracts the gloss control value "0" (0% in gloss control rate) and the gloss control values "157" to "206" (representative values "159" to "204" and gloss control rate 71% to 80%). In this case, the calculator 56J leads "11" as the number N of gloss control values, the value "11" corresponding to the total value of the number of sectioned groups "10" obtained by sectioning the gloss control rates (71% to 80%) of the gloss control values for every 1% and the number of gloss control value "0", which is "1".

On the basis of the special color density value determined by the eight-bit clear plane data acquired by the acquirer 56A, the determiner 56K determines special color density representative values of the number N of control values calculated by the calculator 56J.

FIGS. 13A to 13D are explanatory views illustrating how to determine the special color density representative values.

The determiner 56K generates the frequency distribution representing how frequently the special color density value appears in the pixels in the eight-bit clear plane data acquired by the acquirer 56A.

Figure 13A:
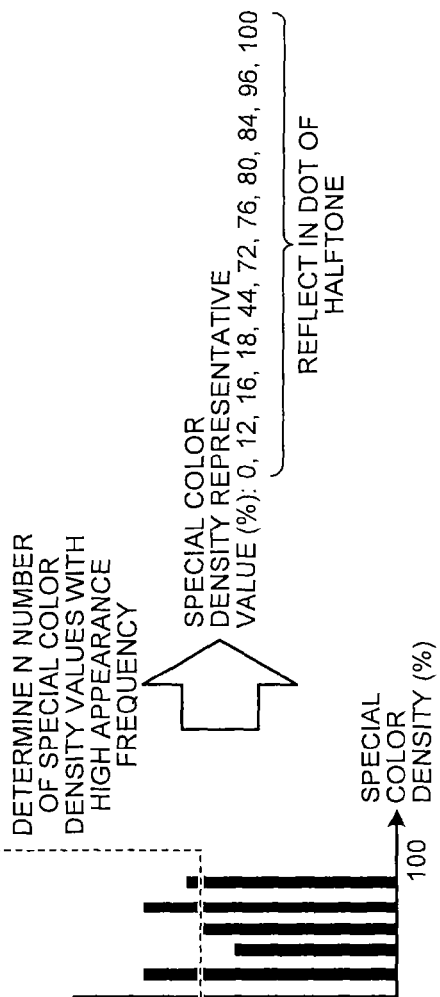
FIGS. 13A to 13D are explanatory views illustrating how to determine special color density representative values.

FIG. 13A is a view illustrating an example of the frequency distribution. For example, as illustrated in FIG. 13A, the determiner 56K generates the frequency distribution representing the relation between the special color density values (expressed in special color density rate (%) in FIG. 13A) of the pixels in the eight-bit clear plane data and how frequently each special color density value appears in the pixels in the clear plane data.

The determiner 56K determines whether the frequency distribution has a predetermined characteristic. This characteristic may be any characteristic. For example, the determiner 56K determines that the frequency distribution has the characteristic if the ratio of the lowest frequency to the highest frequency is 50% or less. The condition of determining that the distribution has the characteristic may be any condition and the ratio is not limited to 50% or less.

Firstly, a case where the frequency distribution has a predetermined characteristic is described. If the frequency distribution has a predetermined characteristic, the determiner 56K selects special color density values of the number N of control values in descending order of frequency from among the special color density values determined by the eight-bit clear plane data acquired by the acquirer 56A. The determiner 56K then determines the selected special color density values of the number N of control values as the special color density representative values.

This is because the gradation of the special color with a density that appears more frequently needs to be maintained. Thus, the determiner 56K determines special color density values of the number N of control values as the special color density representative values in the order from the highest frequency.

Figure 13B:
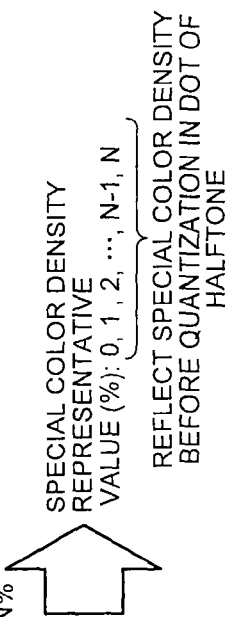

For example, if the determiner 56K has determined that the frequency distribution in FIG. 13A has the characteristic, the determiner 56K determines special color density values of the number N of control values (for example, 11) in the order from the highest frequency (for example, the values are 0, 12, 16, 44, 72, 76, 80, 84, 96, 98, and 100 (expressed in special color density rate (%))) (see FIG. 13B).

Next, a case where the frequency distribution does not have any predetermined characteristic is described. In this case, if the frequency distribution does not have any predetermined characteristic, the determiner 56K quantizes the special color density values determined by the eight-bit clear plane data acquired by the acquirer 56A into the values within the range of 0 or more and the number N of control values or less, and determines the quantized special color density values as the special color density representative values.

Figure 13C:
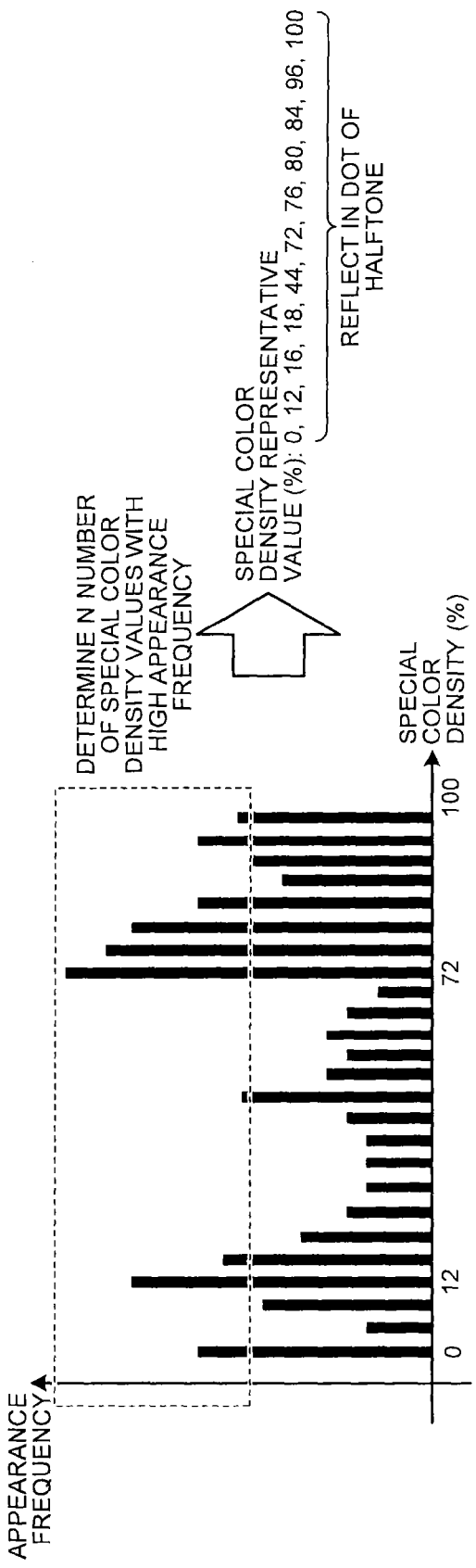

For example, if the frequency distribution does not have any predetermined characteristic, the determiner 56K quantizes the value with a step size of, for example, "1" using the special color density value determined by the clear plane data as the input value, so that the output value becomes 0 or more and the number N of control values or less (see FIG. 13C). Then, the determiner 56K determines the special color density values after the quantization (for example, 0 to the number N of control values) as the special color density representative values (see FIG. 13D). The step size is not limited to "1" and may be any number. In this case, each of the special color density representative values is an integer represented by any of 0 to the number N of control values.

In FIG. 11, the generator 56L generates a conversion table in which each gloss control value of the number N of control values calculated by the calculator 56J is associated with the corresponding special color density representative value determined by the determiner 56K. As a result, the special color density value defined in the clear plane data is registered in the conversion table as the special color density representative values. This means that the conversion table treats the special color density value as the special color density representative value. The generator 56L stores the generated conversion table in the storage 56B.

FIG. 14 is a table illustrating an example of the data configuration of the conversion table.

As described above, the conversion table has the gloss control values and the special color density representative values associated with each other. FIG. 14 illustrates an example of the unused control rate and the special color density rate that respectively express the gloss control values and the special color density representative values in percentage. The conversion table may alternatively list each of the gloss control values and the special color density representative values (expressed in numeral of 0 to 255).

The generator 56L registers in the conversion table, the gloss control values of the number N of control values extracted by the extractor 56I. FIG. 14 illustrates an example in which the generator 56L registers gloss control values of 0% and 71% to 80% of the number N of control values, which is a total of 11 in this example, in the conversion table.

The generator 56L registers the special color density representative values determined by the determiner 56K in the conversion table while associating each special color density representative value to the corresponding gloss control value.

The conversion table generator 56C thus generates the conversion table.

In FIG. 11, the second surface effect conversion table generator 56D registers, in the first surface effect conversion table, the definition information according to the special color image specified by the special color density representative value in the conversion table in association with the gloss control value in the conversion table. The second surface effect conversion table generator 56D registers in the first surface effect conversion table, the identification information representing that the data is intended for the clear toner plane (for example, text information representing "for clear conversion") as the type of surface effect for the gloss control value. The second surface effect conversion table generator 56D thus generates a second surface effect conversion table from the first surface effect conversion table.

Specifically, the second surface effect conversion table generator 56D registers the definition information in accordance with the determination result made by the determiner 56K as to whether the frequency distribution has the characteristic.

Firstly, a case where the frequency distribution has a predetermined characteristic is described. The second surface effect conversion table generator 56D reads the gloss control values in the conversion table. The second surface effect conversion table generator 56D then reads the special color density representative values corresponding to the read gloss control values from the conversion table. The second surface effect conversion table generator 56D uses the read special color density representative value as a special color density value to identify the definition information corresponding to the special color density value. Examples of the definition information corresponding to the special color density value include information indicating dot images of the halftone 0% and 12% to 100%.

The definition information corresponding to the special color density values may be stored in the storage 56B in advance. Specifically, the definition information (for example, information indicating respective dot images of the halftone 0% and 12 to 100%) may be stored in association with the special color density values in the storage 56B in advance.

The second surface effect conversion table generator 56D generates a copy of the first surface effect conversion table. The second surface effect conversion table generator 56D then registers the definition information in the definition information fields corresponding to the respective read gloss control values in the generated copy of the first surface effect conversion table. Here, the second surface effect conversion table generator 56D registers the specified definition information corresponding to the special color density values having the same values as those of read gloss control values. The second surface effect conversion table generator 56D thus generates the second surface effect conversion table.

For example, it is assumed that the determiner 56K has determined the special color density values of 0, 12, 16, 18, 44, 72, 76, 80, 84, 96, and 100 in FIG. 13B as the special color density representative values. In this example, as illustrated in FIG. 14, the special color density representative values of 0, 12, 16, 18, 44, 72, 76, 80, 84, 96, and 100 are registered in the conversion table.

In this case, the second surface effect conversion table generator 56D registers, in the first surface effect conversion table, information indicating dot images with the special color density representative values (0, 12, 16, 18, 44, 72, 76, 80, 84, 96, and 100) corresponding to the gloss control values in the conversion table as the definition information. The second surface effect conversion table generator 56D generates the second surface effect conversion table from the first surface effect conversion table in this manner.

The second surface effect conversion table generator 56D stores the generated second surface effect conversion table in the storage 56B. Therefore, the storage 56B stores therein the first surface effect conversion table and the newly generated second surface effect conversion table.

FIG. 15 is a table illustrating an example of the second surface effect conversion table generated from the first surface effect conversion table illustrated in FIG. 12.

For example, the second surface effect conversion table generator 56D registers the identification information "for clear plane conversion" as the type of surface effect for each gloss control value of the gloss control values (gloss control rate 0% (see the rectangular frame B in FIG. 12), 71 to 80% (see rectangular frame A in FIG. 12)) in the first surface effect conversion table in FIG. 12. Moreover, the second surface effect conversion table generator 56D registers information indicating the dot image with the special color density rate of each of the halftone 0%, and 12% to 100% as the definition information for the gloss control values. Thus, the second surface effect conversion table generator 56D generates the second surface effect conversion table illustrated in FIG. 15.

Thus, in the second surface effect conversion table, each of the gloss control values in the first gloss control plane data, the type of surface effect, and the definition information are associated with each other. In the second surface effect conversion table, each of the gloss control values obtained by the conversion of the special color density values in the clear plane table according to the conversion table, the type of surface effect, and the definition information are also associated with each other.

Next, a case where the frequency distribution does not have any predetermined characteristic is described.

In this case, the second surface effect conversion table generator 56D registers in the first surface effect conversion table, information indicating a dot image with the special color density value before the quantization for the gloss control value in the conversion table as the definition information for the gloss control value in the conversion table. Thus, the second surface effect conversion table generator 56D generates the second surface effect conversion table.

Figure 13D:
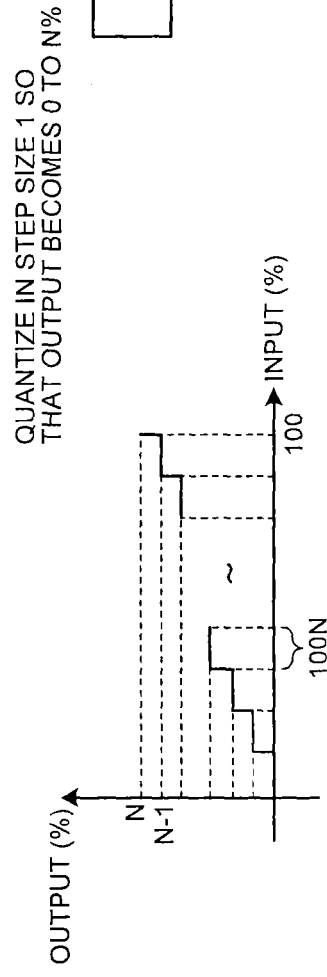

For example, it is assumed that the determiner 56K has determined that the frequency distribution does not have any predetermined characteristic and quantized the special color density values determined by the clear plane data into the values within the range of 0 or more and the number N of control values or less as illustrated in FIG. 13D, and decided the quantized special color density value as the special color density representative value.

In this example, the second surface effect conversion table generator 56D registers the information indicating the dot image with the special color density value before the quantization as the definition information in the first surface effect conversion table, and generates the second surface effect conversion table. The second surface effect conversion table generator 56D stores the generated second surface effect conversion table in the storage 56B.

As illustrated in FIG. 11, the second gloss control plane data generator 56E generates the second gloss control plane data in which the special color density values in the eight-bit clear plane data acquired by the acquirer 56A are converted into the corresponding gloss control values in the conversion table.

Here, the gloss control values extracted by the extractor 56I are the gloss control values unused in the first gloss control plane as described above. The gloss control values extracted by the extractor 56I are also the gloss control values not associated with the type of surface effect and the definition information in the first surface effect conversion table as described above. Thus, by the second gloss control plane data generator 56E, the clear plane data defining a special color density value of the special color image is converted into the second gloss control plane data defining a gloss control value.

The integration unit 56F integrates the first gloss control plane data acquired by the acquirer 56A and the second gloss control plane data to generate third gloss control plane data.

Specifically, the integration unit 56F generates the third gloss control plane data by employing the pixel value (i.e., the gloss control value) in the plane (first gloss control plane data or second gloss control plane data) that is set for each pixel at the same pixel position in regard to each pixel in the first gloss control plane data and each pixel in the second gloss control plane data.

The expression that the gloss control value is set means that the gloss control value is 1 or more. If the pixel value has been set for each of the pixels at the same position in the first gloss control plane data and the second gloss control plane data, the gloss control value of the plane (first gloss control plane data or second gloss control plane data) based on the preset priority setting is employed.

The priority setting indicates which one of the first gloss control plane data and the second gloss control plane data is on the priority. The priority setting is input by the user's operation with an input unit, which is not shown, and is stored in the storage 56B. The priority on the first gloss control plane data or the clear plane data may be received from the user through the input unit (not shown) when the print data is generated in the host device 10. In this case, the host device 10 generates the priority setting on the first gloss control plane data upon the reception of the priority on the first gloss control plane data; on the other hand, the host device 10 generates the priority setting on the second gloss control plane data upon the reception of the priority on the clear plane data. Then, the host device 10 has the priority setting included in the print data and outputs the data to the DFE 50. The DFE 50 determines which one is on the priority by reading the priority setting included in the print data.

The clear toner plane generator 56G generates the clear toner plane data in accordance with: the second surface effect conversion table generated by the second surface effect conversion table generator 56D; and the third gloss control plane data generated by the integration unit 56F.

Specifically, the clear toner plane generator 56G reads the type of surface effect corresponding to the gloss control value of each pixel included in the third gloss control plane data, the on/off information, and the definition information with reference to the second surface effect conversion table (for example, see FIG. 15).

The clear toner plane generator 56G determines the on/off of the glosser 80 from the above reading result, and generates the two-bit clear toner plane data used for applying the special color toner by generating the inverse mask or the solid mask as appropriate with the use of the eight-bit CMYK color plane data after the gamma correction. Here, the clear toner plane generator 56G generates the clear toner plane data (clear toner plane 1) used in the printer 70 and the clear toner plane data (clear toner plane 2) used in the low-temperature fixer 90 as appropriate in accordance with the definition information for the gloss control value of the third gloss control plane data in the second surface effect conversion table.

The clear toner plane generator 56G outputs the generated two-bit clear toner plane data and the determined on/off information for turning on or off the glosser 80 to the si3 57. The process of the si3 57 (see FIG. 9) is as described above and is not repeated here.

Figure 16:
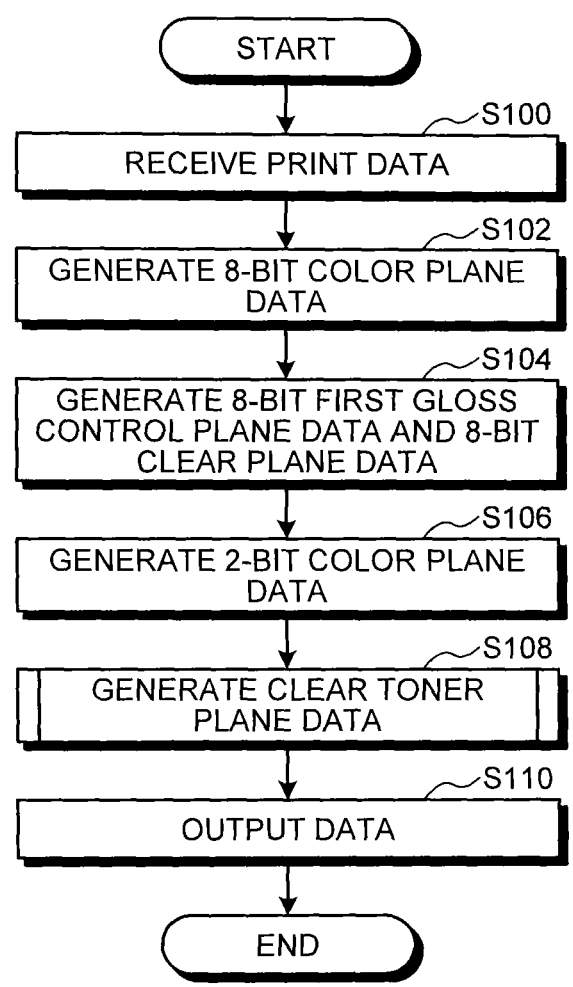
FIG. 16 is a flowchart illustrating the procedure of image processing executed by the DFE.

Next, the procedure of the image processing executed by the DFE 50 according to the present embodiment is described. FIG. 16 is a flowchart of the procedure of the image processing executed by the DFE 50.

First, the DFE 50 receives the print data from the host device 10 (Step S100). Next, the rendering engine 51 converts the color and the format into the raster format in regard to the color plane data included in the print data, and generates the eight-bit CMYK color plane data (Step S102).

Next, the rendering engine 51 converts the format of the first gloss control plane data and the clear plane data included in the print data received at Step S100 into the raster format, and generates the eight-bit first gloss control plane data and the eight-bit clear plane data (Step S104).

Next, the TRC 53 performs the gamma correction with the gamma curve of 1D_LUT generated by the calibration with respect to the eight-bit CMYK color plane data, and outputs the eight-bit CMYK color plane data after the gamma correction to the halftone engine 55 and the clear processing 56 through the si2 54. The halftone engine 55 performs the halftone processing on the eight-bit CMYK color plane data after the gamma correction to generate the two-bit color plane data (Step S106).

Next, the clear processing 56 generates the two-bit clear toner plane data for applying the special color toner in accordance with the eight-bit CMYK color plane data after the gamma correction output from the si2 54 and the eight-bit clear plane data and the eight-bit first gloss control plane data output from the sit 52 (Step S108) (the details will be described below). The clear processing 56 generates the on/off information for the glosser 80.

Next, the si3 57 outputs the output data to the printing machine 30 through the MIC 60 (Step S110). The output data includes the eight-bit CMYK color plane data received from the halftone engine 55, the eight-bit clear toner plane data received from the clear processing 56, and the on/off information for the glosser 80. This is the end of the routine.

Next, the process of generating the clear toner plane data (Step S108) in FIG. 16 is described.

Figure 17:
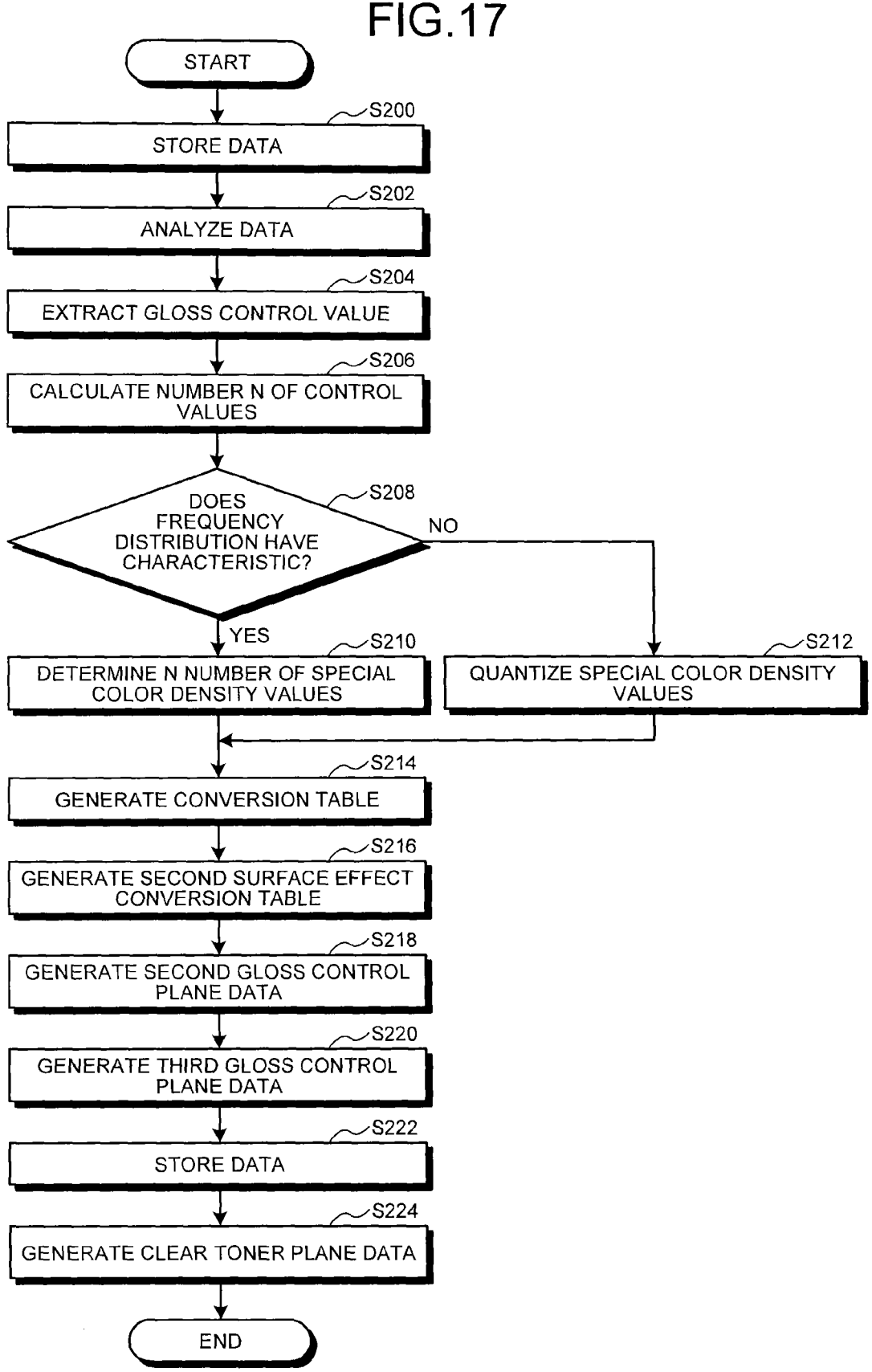
FIG. 17 is a flowchart illustrating the procedure of image processing (clear toner plane generation process) executed by the clear processing.

FIG. 17 is a flowchart of the procedure of the image processing (process of generating the clear toner plane) executed by the clear processing 56.

First, the acquirer 56A acquires the eight-bit first gloss control plane data and the eight-bit clear plane data from the rendering engine 51. The acquirer 56A acquires the eight-bit CMYK color plane data after the gamma correction from the si2 54. The acquirer 56A stores these pieces of data (eight-bit first gloss control plane data, eight-bit clear plane data, and eight-bit CMYK color plane data) in the storage 56B (Step S200).

Next, the analyzer 56H reads the gloss control value of each pixel by analyzing the eight-bit first gloss control plane data acquired by the acquirer 56A (Step S202).

Next, the extractor 56I extracts the gloss control value unused in the eight-bit first gloss control plane data in accordance with the analysis result at Step S202 (Step S204).

Next, the calculator 56J calculates the number N of gloss control values extracted at Step S204 (Step S206).

Next, the determiner 56K generates the frequency distribution representing how frequently the special color density value of each pixel appears in the eight-bit clear plane data acquired by the acquirer 56A. The determiner 56K determines whether the frequency distribution has a predetermined characteristic (Step S208).

If Yes at Step S208 (Yes at Step S208) (the frequency distribution has the characteristic), the process advances to Step S210. At Step S210, the determiner 56K determines special color density values of the number N of control values calculated at Step S206 as the special color density representative values in descending order of frequency among the special color density values defined in the eight-bit clear plane data acquired by the acquirer 56A (Step S210). Then, the process advances to Step S214.

If No at Step S208 (No at Step S208) (the frequency distribution does not have any characteristic), the process advances to Step S212. At Step S212, the determiner 56K quantizes the special color density values defined in the eight-bit clear plane data acquired by the acquirer 56A into the values within the range of 0 or more and the number N of control values or less, and determines the quantized special color density values as the special color density representative values (Step S212). Then, the process advances to Step S214, which will be described below.

The processes at Step S210 and Step S212 can minimize the deterioration in gradation of the special color density value in the clear plane data, which would occur when the second gloss control plane data is generated from the clear plane data.

At Step S214, the generator 56L generates the conversion table in which gloss control values, extracted by the extractor 56I, of the number N of control values calculated by the calculator 56J are associated with the special color density representative values determined by the determiner 56K (Step S214). The generator 56L then stores the generated conversion table in the storage 56B.

Next, the second surface effect conversion table generator 56D generates the second surface effect conversion table (Step S216).

Next, the second gloss control plane data generator 56E generates the second gloss control plane data by converting the special color density value in the eight-bit clear plane data acquired by the acquirer 56A into the corresponding gloss control value in the conversion table (Step S218). The process of Step S218 converts the clear plane data with the special color density value defined by pixel into the second gloss control plane data with the gloss control value defined by pixel.

Next, the integration unit 56F integrates the first gloss control plane data acquired by the acquirer 56A and the second gloss control plane data generated at Step S218 to generate the third gloss control plane data (Step S220).

Next, the integration unit 56F stores the third gloss control plane data generated at Step S220 in the storage 56B (Step S222).

Next, on the basis of the second surface effect conversion table generated at Step S216, the clear toner plane generator 56G generates the clear toner plane data (Step S224). This is the end of the routine.

As thus described, the DFE 50 according to the present embodiment includes the acquirer 56A, the storage 56B, the conversion table generator 56C, the second surface effect conversion table generator 56D, the second gloss control plane data generator 56E, the integration unit 56F, and the clear toner plane generator 56G.

The acquirer 56A acquires the first gloss control plane data and the clear plane data. The first gloss control plane data defines the gloss control value that designates the type of visual or tactile surface effect on the recording medium and the region on the recording medium to which the surface effect is to be applied. The clear plane data defines the special color density value that designates the special color image other than the surface effect.

The storage 56B stores therein the first surface effect conversion table in which the gloss control value, the type of surface effect, and the definition information of the clear toner plane data to be used in the executer (the printing machine 30) that applies the special color toner to the recording medium in accordance with the clear toner plane data are associated with each other in advance.

The extractor 56I extracts the unused gloss control values in the first gloss control plane data. The conversion table generator 56C generates the conversion table that defines the special color density values for the extracted unused control values. The second surface effect conversion table generator 56D generates the second surface effect conversion table obtained by registering in the first surface effect conversion table, the definition information in accordance with the special color image specified by the corresponding special color density value in the conversion table in association with the gloss control value in the conversion table.

The second gloss control plane data generator 56E generates the second gloss control plane data in which the special color density value in the clear plane data is converted into the corresponding gloss control value in the conversion table. The integration unit 56F integrates the first gloss control plane data and the second gloss control plane data to generate the third gloss control plane data.

The clear toner plane generator 56G generates the clear toner plane data on the basis of the second surface effect conversion table and the third gloss control plane data.

In this manner, the DFE 50 according to the present embodiment extracts the unused gloss control values in the first gloss control plane data. The DFE 50 generates the conversion table in which the special color density values in the clear plane data and the extracted gloss control values are associated with each other. The DFE 50 generates the second surface effect conversion table in which the gloss control values extracted by the extractor 56I among the gloss control values in the first surface effect conversion table are used as the region to register the definition information in accordance with the clear plane data.

With the use of the conversion table, the DFE 50 converts the clear plane data with the defined special color density value of the special color image into the second gloss control plane data with the special color density value expressed in the gloss control value. The DFE 50 generates the clear toner plane data with the use of the third gloss control plane data obtained by integrating the second gloss control plane data and the first gloss control plane data.

Here, it has conventionally been necessary to process planes (data) of two types, the gloss control plane data and the clear plane data, when generating the clear toner plane data. In contrast, the DFE 50 according to the present invention generates the clear toner plane data using a plane of one type (the third gloss control plane data). This means that the DFE 50 according to the present invention generates the clear toner plane data using the third gloss control plane data and the second surface effect conversion table. This enables reduction in processing load as compared with the conventional method where the clear toner plane data are generated with the use of the planes of two types (the clear plane data and the first gloss control plane data) and the first surface effect conversion table.

Thus, the DFE 50 according to the present embodiment can provide the advantageous effect of reducing a processing load in generation of the clear toner plane data.

The clear toner plane data is generated using the second surface effect conversion table. The gloss control values unused in the first gloss control plane data in the first surface effect conversion table can thus be employed for the clear plane data, which can maximize the density range that expresses the gradation of the clear toner plane data.

In the DFE 50 according to the present embodiment, the second surface effect conversion table generator 56D registers in the first surface effect conversion table, information indicating the dot image with the special color density representative value (special color density value) in the conversion table as the definition information, and generates the second surface effect conversion table.

In the DFE 50 according to the present embodiment, the second surface effect conversion table generator 56D registers in the first surface effect conversion table, information indicating the dot image with the special color density value before the quantization in the conversion table as the definition information, and generates the second surface effect conversion table.

This operation enables the DFE 50 according to the present embodiment to, in addition to providing the aforementioned advantageous effect, generate the clear toner plane data without deteriorating the design and the special color density value of the special color image defined in the clear plane data.

In the DFE 50 according to the present embodiment, the extractor 56I extracts the gloss control values unused in the first gloss control plane data and the gloss control values not associated with the type of surface effect and the definition information in the first surface effect conversion table. Thus, the DFE 50 according to the present embodiment can generate the second gloss control plane data more faithfully reflecting the special color density values according to the clear plane data before the conversion. Accordingly, the DFE 50 can suppress the deterioration in the image quality of the clear plane data set by the user in addition to the above advantageous effect.

In the above embodiment, the storage 56B stores therein the first surface effect conversion table, the conversion table, the second surface effect conversion table, and the clear toner plane data. The storage 56B, however, stores therein the first surface effect conversion table and at least one of the conversion table, the second surface effect conversion table, the clear toner plane data, and the second gloss control plane data.

With the second surface effect conversion table after the conversion, the second gloss control plane data, the clear toner plane data, and the like stored in the storage 56B, these pieces of data generated in the past (the second surface effect conversion table, the second gloss control plane data, and the clear toner plane data) stored in the storage 56B can be used in the processes described above for re-printing, for example. In this case, the image processing in the re-printing can be shortened.

The storage 56B may be used as a hot folder, and the DFE 50 may be configured so that the processes illustrated in FIG. 16 and FIG. 17 are sequentially executed upon the storage (registration) of these pieces of data in the storage 56B.

In this case, the aforementioned pieces of data generated by every execution of the processes in the functional units (conversion table generator 56C, second surface effect conversion table generator 56D, second gloss control plane data generator 56E, integration unit 56F, and clear toner plane generator 56G) in FIG. 11 are stored in the storage 56B. Each of the functional units monitors if the data for use in the process of the functional unit is stored in the storage 56B, and upon the storage of the data necessary in the process in the storage 56B, the functional unit executes the process.

First Modification

In the above first embodiment, the DFE 50 and the printing machine 30 are separated. Alternatively, the DFE 50 and each piece of equipment included in the printing machine 30 (at least one of the printer 70, the glosser 80, and the low-temperature fixer 90) may be integrated.

Figure 18:
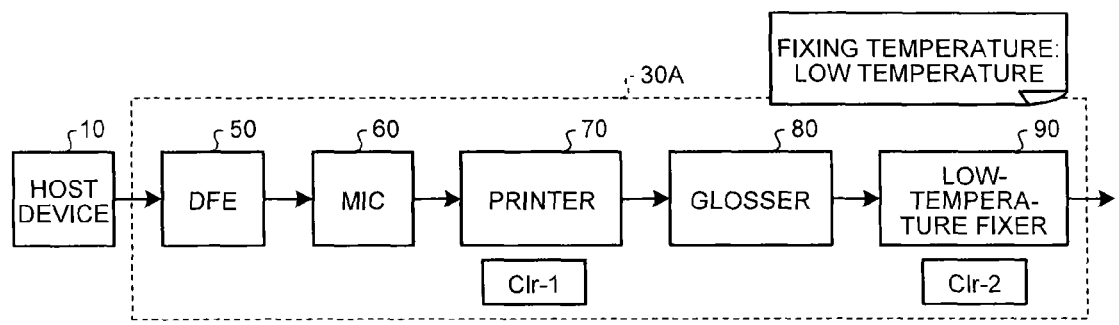
FIG. 18 is a schematic diagram illustrating an example of an image processing system according to a modification.

FIG. 18 is a schematic diagram illustrating an example of an image processing system according to a modification. The image processing system includes the host device 10 and a composite device 30A. The host device 10 and the composite device 30A are connected to each other to exchange signals or data therebetween. The composite device 30A includes the DFE 50, the MIC 60, the printer 70, the glosser 80, and the low-temperature fixer 90.

The host device 10, the DFE 50, the MIC 60, and the printer 70 have configurations similar to those of the first embodiment.

The DFE 50 may be integrated with at least one of the printer 70, the glosser 80, and the low-temperature fixer 90.

Second Embodiment

Any of the plurality of processes executed in one device in the first embodiment may be executed in one or more other devices connected to the one device through a network.

An example of such a configuration is an image processing system according to a second embodiment having a part of the function of the DFE mounted on a server device on a network.

Figure 19:
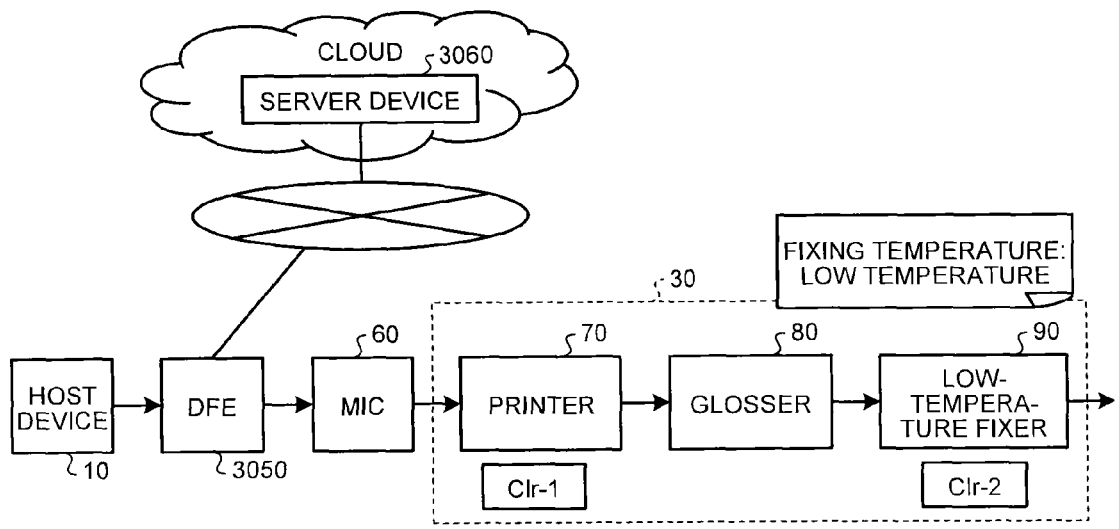
FIG. 19 is a diagram illustrating an example of the configuration of an image processing system.

FIG. 19 is a diagram illustrating an example of the configuration of the image processing system according to the present embodiment. As illustrated in FIG. 19, the image processing system according to the present embodiment includes the host device 10, a DFE 3050, the MIC 60, the printer 70, the glosser 80, the low-temperature fixer 90, and a server device 3060 on a cloud. The host device 10, the MIC 60, the printer 70, the glosser 80, and the low-temperature fixer 90 are similar to those of the first embodiment.

In the present embodiment, the DFE 3050 is connected to the server device 3060 over a network such as the Internet. In the present embodiment, the acquirer 56A, the storage 56B, the analyzer 56H, the extractor 56I, the conversion table generator 56C, the second surface effect conversion table generator 56D, the second gloss control plane data generator 56E, the integration unit 56F, and the clear toner plane generator 56G of the DFE 50 according to the first embodiment are provided on the server device 3060.

In other words, in the present embodiment, the DFE 3050 is connected to the single server device 3060 through the network (cloud) such as the Internet and the server device 3060 generates the clear toner plane data.

Figure 20:
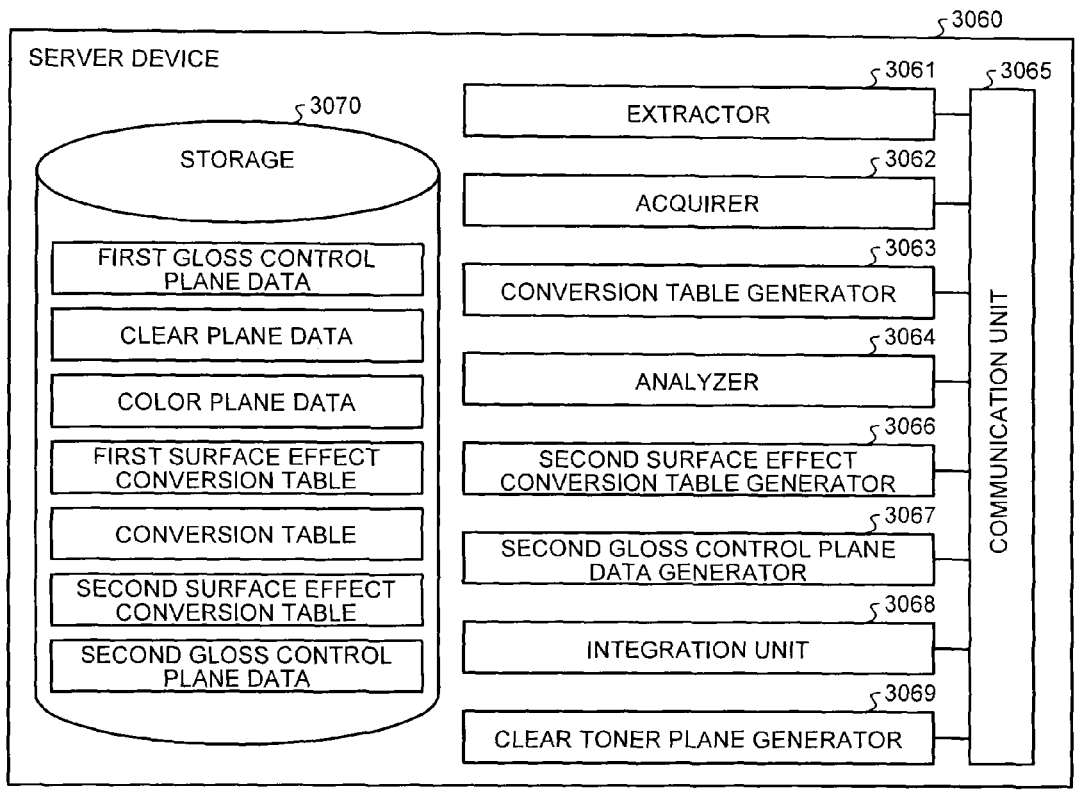
FIG. 20 is a block diagram illustrating the functional configuration of a server device.

First, the server device 3060 is described. FIG. 20 is a block diagram illustrating the functional configuration of the server device 3060 according to the present embodiment. The server device 3060 includes a storage 3070, an acquirer 3062, a conversion table generator 3063, an analyzer 3064, an extractor 3061, a second surface effect conversion table generator 3066, a second gloss control plane data generator 3067, an integration unit 3068, a clear toner plane generator 3069, and a communication unit 3065.

The storage 3070 is a storage medium such as an HDD and a memory. The storage 3070 corresponds to the storage 56B in the first embodiment.

The communication unit 3065 exchanges various kinds of data and requests with the DFE 3050. More specifically, the communication unit 3065 receives the eight-bit first gloss control plane data, the eight-bit clear plane data, and the eight-bit color plane data from the DFE 3050. The communication unit 3065 outputs the clear toner plane data and the on/off information generated by the clear toner plane generator 3069 to the DFE 3050. The acquirer 3062, the conversion table generator 3063, the analyzer 3064, the extractor 3061, the second surface effect conversion table generator 3066, the second gloss control plane data generator 3067, the integration unit 3068, and the clear toner plane generator 3069 correspond to the acquirer 56A, the conversion table generator 56C, the analyzer 56H, the extractor 56I, the second surface effect conversion table generator 56D, the second gloss control plane data generator 56E, the integration unit 56F, and the clear toner plane generator 56G, respectively.

Figure 21:
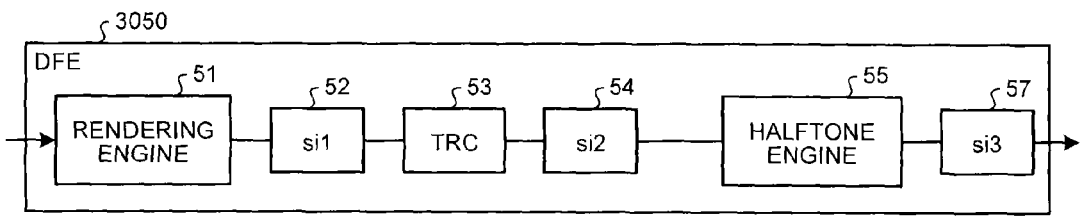
FIG. 21 is a block diagram illustrating the functions of the DFE.

FIG. 21 is a block diagram illustrating the functions of the DFE 3050.

The DFE 3050 includes the rendering engine 51, the si1 52, the TRC 53, the si2 54, the halftone engine 55, and the si3 57. The DFE 3050 is similar to the DFE 50 of the first embodiment except that the DFE 3050 does not include the clear processing 56, transmits the data to be output to the clear processing 56 to the server device 3060, and receives the data received from the clear processing 56 from the server device 3060.

The si1 52 of the DFE 3050 transmits the eight-bit first gloss control plane data and the eight-bit clear plane data to the server device 3060. The si2 54 of the DFE 50 transmits the eight-bit CMYK color plane data after the gamma correction to the server device 3060. The si3 57 of the DFE 3050 receives the two-bit clear toner plane data and the on/off information from the server device 3060. The si3 57 outputs the output data including the received two-bit clear toner plane data and on/off information and the two-bit CMYK color plane data received from the halftone engine 55 to the printer 70 through the MIC 60.

Figure 22:
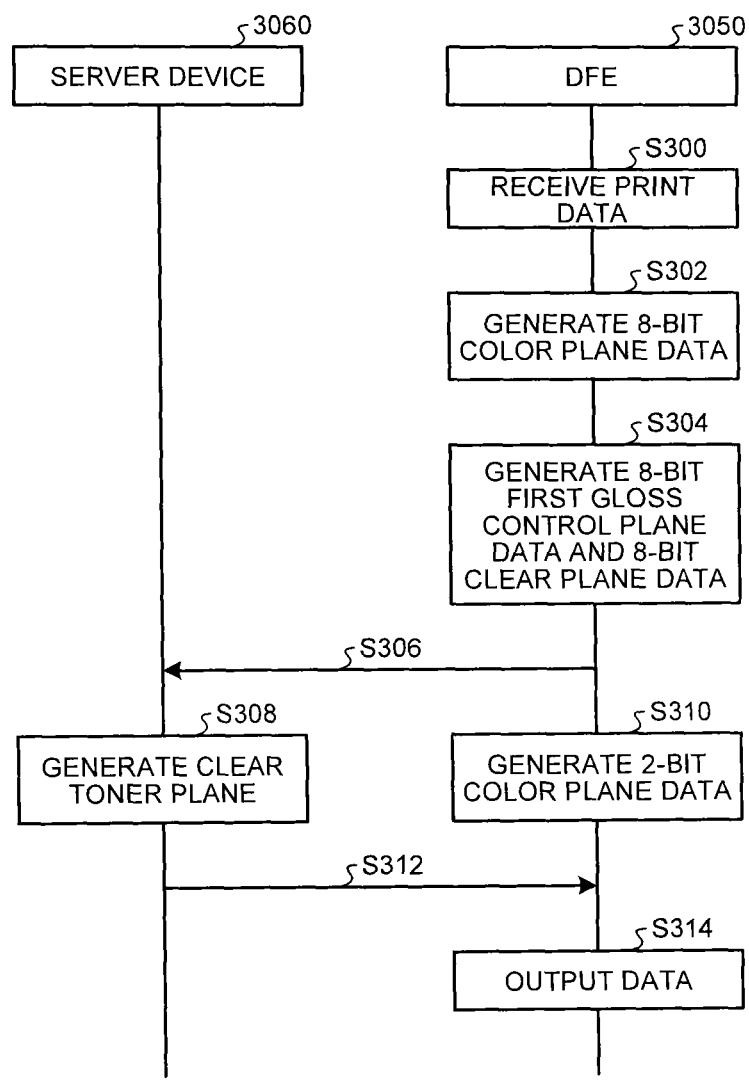
FIG. 22 is a sequence diagram illustrating the entire image processing.

Next, the image processing by the image processing system according to the present embodiment with the above configuration is described. FIG. 22 is a sequence diagram illustrating the entire image processing according to the present embodiment.

First, the DFE 3050 acquires print data (Step S300). Next, the DFE 3050 generates the eight-bit CMYK color plane data (Step S302). Then, the DFE 3050 generates the eight-bit clear plane data and the eight-bit first gloss control plane data (Step S304).

Next, the DFE 3050 transmits the eight-bit CMYK color plane data, the eight-bit clear plane data, and the eight-bit first gloss control plane data to the server device 3060 (Step S306).

Next, the server device 3060 executes the clear toner plane generation process (Step S308). The process of Step S308 is similar to the process illustrated in FIG. 17.

The DFE 3050 generates the two-bit CMYK color plane data from the eight-bit CMYK color plane data (Step S310).

Next, the server device 3060 transmits the generated two-bit clear toner plane data to the DFE 3050 (Step S312). Then, the DFE 3050 outputs the output data to the printing machine 30 through the MIC 60 (Step S314). This is the end of the routine.

The processes in the MIC 60 and the printer 70 are similar to those of the first embodiment.

In the present embodiment, the clear toner plane data is generated by the server device 3060 on the cloud. This operation produces the effect similar to that of the first embodiment. Even in the presence of a plurality of DFEs 3050, the output data can be collectively generated, which is convenient for the administrator.

Second Modification

The storage 3070, the acquirer 3062, the conversion table generator 3063, the second surface effect conversion table generator 3066, the second gloss control plane data generator 3067, the integration unit 3068, the clear toner plane generator 3069, and the communication unit 3065 are provided in the single server device 3060 on the cloud, and the clear toner plane data is generated in the server device 3060 in the first modification. The configuration, however, is not limited thereto.

Figure 23:
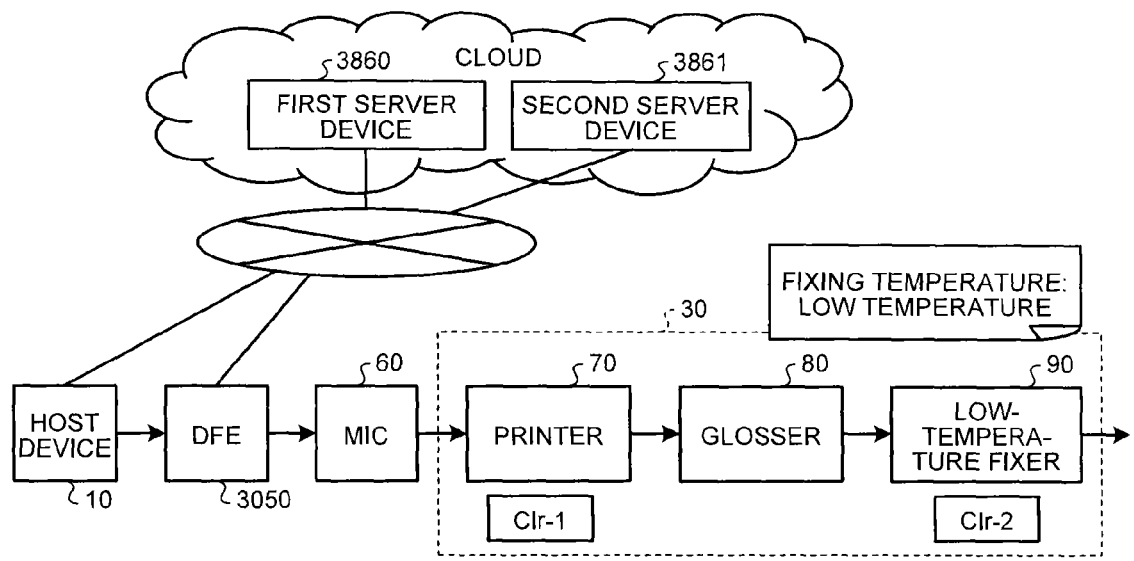
FIG. 23 is a network configuration diagram.

For example, two or more server devices are provided on the cloud to execute the processes dispersedly in the two or more server devices. FIG. 23 is a diagram illustrating a network configuration including two servers (a first server device 3860 and a second server device 3861) on the cloud. In the example of FIG. 23, the clear toner plane data is generated dispersedly in the first server device 3860 and the second server device 3861. The processes in the server devices may be dispersed in any way.

Specifically, any of the plurality of processes executed in one device may be executed in one or more other devices connected to the one device through a network.

If one or more other devices connected to the one device through a network are used, this configuration requires the process of inputting/outputting data between the one device and another device and between other devices, such as the process of outputting the data (information) generated in the process performed in the one device from the one device to the other device and the process of inputting the data from the other device.

If the number of other devices is one, the process of inputting/outputting the data between the one device and the other device is included. If the number of other devices is two or more, the processes of inputting/outputting the data between the one device and another device and between the other devices such as between a first other device and a second other device are included.

In this modification, the server device 3060 or the plural server devices including the first server device 3860 and the second server device 3861 are provided on the cloud; however, the configuration is not limited thereto. For example, the server device 3060 or the plural server devices including the first server device 3860 and the second server device 3861 may be provided on any network such as on the Intranet.

The hardware configuration of the host device 10, the DFEs 50 and 3050, the server device 3060, the first server device 3860, and the second server device 3861 according to the embodiment and modification is described.

Figure 24:
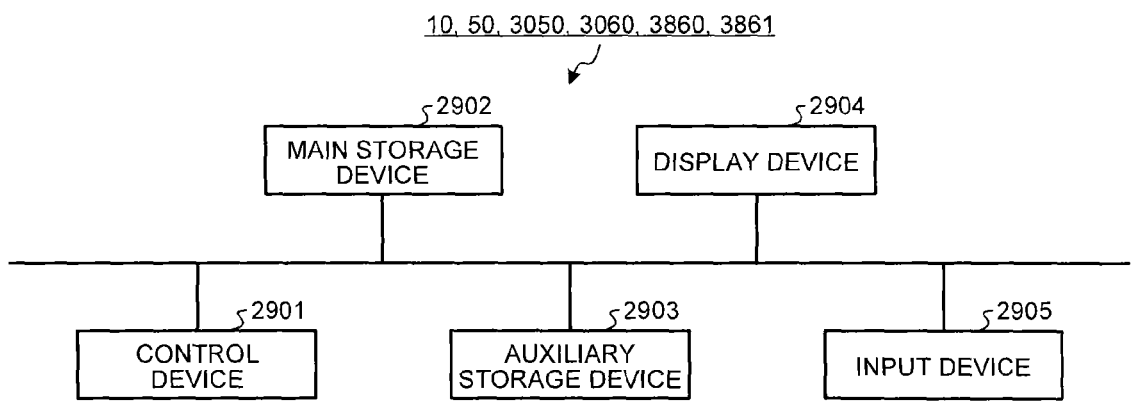
FIG. 24 is a hardware configuration diagram.

FIG. 24 is a hardware configuration diagram of the host device 10, the DFEs 50 and 3050, the server device 3060, the first server device 3860, and the second server device 3861. The host device 10, the DFEs 50 and 3050, the server device 3060, the first server device 3860, and the second server device 3861 each have a hardware configuration including a control device 2901 such as a CPU for controlling the entire device, a main storage device 2902 such as a ROM or a RAM for storing therein various pieces of data and computer programs, an auxiliary storage device 2903 such as an HDD for storing therein various pieces of data and computer programs, an input device 2905 such as a keyboard or a mouse, and a display device 2904 such as a display, which corresponds to the hardware configuration of a typical computer.

The image processing (including the image processing application, the same applies hereinafter) executed in host device 10, the DFEs 50 and 3050, the server device 3060, the first server device 3860, and the second server device 3861 according to the above embodiments and modifications is recorded in a computer-readable recording medium such as a CD-ROM, a flexible disk (FD), a CD-R, or a digital versatile disc (DVD) with files in the installable format or executable format, and provided as a computer program product.

The image processing program executed in host device 10, the DFEs 50 and 3050, the server device 3060, the first server device 3860, and the second server device 3861 according to the above embodiments and modifications may be stored in a computer connected to a network such as the Internet so that the program can be downloaded through the network. The image processing program executed in host device 10, the DFEs 50 and 3050, the server device 3060, the first server device 3860, and the second server device 3861 according to the above embodiments and modifications may be provided or distributed through a network such as the Internet.

The image processing program executed in host device 10, the DFEs 50 and 3050, the server device 3060, the first server device 3860, and the second server device 3861 according to the above embodiments and modifications may be incorporated in a ROM or the like and provided.

The printer system according to the above embodiments includes the MIC 60 but the present invention is not limited thereto. The process and function of the MIC 60 may be provided for another device such as the DFE 50, and the MIC 60 may be omitted.

According to the present invention, the processing load for generation of the clear toner plane data can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    circuitry configured to:
        acquire first gloss control plane data and clear plane data, the first gloss control plane data defining a gloss control value that specifies a type of visual or tactile surface effect on a recording medium and a region on the recording medium to which the surface effect is to be applied, the clear plane data defining a special color density value that specifies a special color image other than the surface effect;
        store a first surface effect conversion table in which the gloss control value, the type of surface effect, and definition information of clear toner plane data used in an image forming device to apply a special color toner on the recording medium in accordance with the clear toner plane data are associated with each other;
        extract the gloss control value unused in the first gloss control plane data;
        generate a conversion table defining the special color density value corresponding to the extracted gloss control value;
        generate a second surface effect conversion table obtained by registering, in the first surface effect conversion table, definition information corresponding to the special color image specified by the special color density value in the conversion table in association with the gloss control values in the conversion table;
        generate second gloss control plane data in which the special color density value in the clear plane data is converted into the corresponding gloss control value in the conversion table;
        integrate the first gloss control plane data and the second gloss control plane data to generate third gloss control plane data; and
        generate the clear toner plane data based on the second surface effect conversion table and the third gloss control plane data.

2. The image processing apparatus according to claim 1, wherein the circuitry is further configured to:
    calculate the number of the extracted gloss control values;
    determine special color density representative values of the number of control values among the special color density values defined by the clear plane data; and
    generate the conversion table in which each of the gloss control values of the number of control values is associated with the corresponding determined special color density representative value as the special color density value.

3. The image processing apparatus according to claim 2, wherein if a frequency distribution representing how frequently the special color density value in each pixel appears in the clear plane data has a predetermined characteristic, the circuitry is configured to determine the special color density values of the number of control values as the special color density representative values among the special color density values defined by the clear plane data in the order from the highest frequency.

4. The image processing apparatus according to claim 3, wherein the circuitry is configured to generate the second surface effect conversion table obtained by registering, in the first surface effect conversion table, information indicating a dot image with the special color density value in the conversion table as the definition information in association with the gloss control value in the conversion table.

5. The image processing apparatus according to claim 3, wherein if the frequency distribution in the clear plane data does not have the predetermined characteristic, the circuitry is configured to quantize the special color density value defined by the clear plane data in a range of 0 or more and the number of control values or less and determines the quantized special color density value as the special color density representative value.

6. The image processing apparatus according to claim 5, wherein the circuitry is configured to generate the second surface effect conversion table obtained by registering, in the first surface effect conversion table, information indicating a dot image with the special color density value before quantization in the conversion table as the definition information in association with the gloss control value in the conversion table.

7. The image processing apparatus according to claim 1, wherein the circuitry is configured to extract the gloss control value unused in the first gloss control plane data and the gloss control value with which the type of surface effect and the definition information in the first surface effect conversion table are not associated.

8. The image processing apparatus according to claim 7, wherein if a frequency distribution representing how frequently the special color density value in each pixel appears in the clear plane data has a predetermined characteristic, the circuitry is configured to determine the special color density values of the number of control values as the special color density representative values among the special color density values defined by the clear plane data in the order from the highest frequency.

9. The image processing apparatus according to claim 8, wherein the circuitry is configured to generate the second surface effect conversion table obtained by registering, in the first surface effect conversion table, information indicating a dot image with the special color density value in the conversion table as the definition information in association with the gloss control value in the conversion table.

10. The image processing apparatus according to claim 8, wherein if the frequency distribution in the clear plane data does not have the predetermined characteristic, the circuitry is configured to quantize the special color density value defined by the clear plane data in a range of 0 or more and the number of control values or less and determines the quantized special color density value as the special color density representative value.

11. The image processing apparatus according to claim 10, wherein the circuitry is configured to generate the second surface effect conversion table obtained by registering, in the first surface effect conversion table, information indicating a dot image with the special color density value before quantization in the conversion table as the definition information in association with the gloss control value in the conversion table.

12. The image processing apparatus according to claim 1, wherein the circuitry is configured to store at least one of the first surface effect conversion table, the conversion table, the second surface effect conversion table, the second gloss control plane data, and the clear toner plane data.

13. An image processing method comprising:
acquiring first gloss control plane data and clear plane data, the first gloss control plane data defining a gloss control value that specifies a type of visual or tactile surface effect on a recording medium and a region on the recording medium to which the surface effect is to be applied, the clear plane data defining a special color density value that specifies a special color image other than the surface effect;
extracting the gloss control value unused in the first gloss control plane data;
generating a conversion table defining the special color density value corresponding to the extracted gloss control value;
storing the first surface effect conversion table in which the gloss control value, the type of surface effect, and definition information of clear toner plane data used in an image forming device to apply a special color toner on the recording medium in accordance with the clear toner plane data are associated with each other;
generating a second surface effect conversion table obtained by registering, in the first surface effect conversion table, definition information corresponding to the special color image specified by the special color density value in the conversion table in association with the gloss control value in the conversion table;
generating second gloss control plane data in which the special color density value in the clear plane data is converted into the corresponding gloss control value in the conversion table;
integrating the first gloss control plane data and the second gloss control plane data to generate third gloss control plane data; and
generating the clear toner plane data based on the second surface effect conversion table and the third gloss control plane data.

14. An image processing system comprising:
an image forming device configured to apply a special color toner on a recording medium in accordance with clear toner plane data; and
circuitry configured to:
acquire first gloss control plane data and clear plane data, the first gloss control plane data defining a gloss control value that specifies a type of visual or tactile surface effect on the recording medium and a region on the recording medium to which the surface effect is to be applied, the clear plane data defining a special color density value that specifies a special color image other than the surface effect;
store a first surface effect conversion table in which the gloss control value, the type of surface effect, and definition information of the clear toner plane data used in the image forming device are associated with each other;
extract the gloss control value unused in the first gloss control plane data;
generate a conversion table defining the special color density value corresponding to the extracted gloss control value;
generate a second surface effect conversion table obtained by registering, in the first surface effect conversion table, definition information corresponding to the special color image specified by the special color density value in the conversion table in association with the gloss control value in the conversion table;
generate second gloss control plane data in which the special color density value in the clear plane data is converted into the corresponding gloss control value in the conversion table;
integrate the first gloss control plane data and the second gloss control plane data to generate third gloss control plane data; and
generate the clear toner plane data based on the second surface effect conversion table and the third gloss control plane data.

* * * * *